US012182192B1

(12) United States Patent
Mahajan et al.

(10) Patent No.: US 12,182,192 B1
(45) Date of Patent: Dec. 31, 2024

(54) CONTENT IDENTIFICATION USING FINGERPRINTING

(71) Applicant: Amazon Technologies, Inc., Seattle, WA (US)

(72) Inventors: Nagaraj Mahajan, Allston, MA (US); Ahmed Abdelal, North Andover, MA (US); Sumit Garg, Acton, MA (US); Sai Kiran Venkata Subramanya Rupanagudi, Burien, WA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 17/854,219

(22) Filed: Jun. 30, 2022

(51) Int. Cl.
*G06F 16/00* (2019.01)
*G06F 16/41* (2019.01)
*G06V 20/40* (2022.01)
*G10L 15/22* (2006.01)

(52) U.S. Cl.
CPC .............. *G06F 16/41* (2019.01); *G06V 20/46* (2022.01); *G10L 15/22* (2013.01); *G10L 2015/223* (2013.01)

(58) Field of Classification Search
CPC ......... G06F 16/41; G06V 20/46; G10L 15/22; G10L 2015/223
See application file for complete search history.

(56) References Cited

U.S. PATENT DOCUMENTS

| | | | | |
|---|---|---|---|---|
| 8,238,669 | B2 * | 8/2012 | Covell | G06F 16/783 |
| | | | | 707/711 |
| 10,606,879 | B1 * | 3/2020 | Wilkinson | G06F 16/48 |
| 11,138,858 | B1 * | 10/2021 | Segal | G10L 15/22 |
| 2009/0052784 | A1 * | 2/2009 | Covell | G06F 16/783 |
| | | | | 382/209 |
| 2015/0104023 | A1 * | 4/2015 | Bilobrov | G06F 16/683 |
| | | | | 381/56 |
| 2020/0356759 | A1 * | 11/2020 | Ashbacher | G06V 40/1365 |
| 2021/0084345 | A1 * | 3/2021 | Cormie | H04N 21/83 |
| 2021/0321154 | A1 * | 10/2021 | Cormie | H04N 21/2407 |
| 2021/0385531 | A1 * | 12/2021 | Einaudi | H04N 21/4223 |
| 2021/0409806 | A1 * | 12/2021 | Merchant | G06V 10/75 |
| 2022/0311589 | A1 * | 9/2022 | Grover | H04N 21/2407 |

* cited by examiner

*Primary Examiner* — Alexander Khong
(74) *Attorney, Agent, or Firm* — Pierce Atwood LLP

(57) ABSTRACT

A system configured to perform content identification using fingerprinting to recognize known media content. The system may generate a reference database including reference fingerprints for each media content item to include in the content identification. In addition, the system may generate a hash table that associates individual frames of the reference fingerprints with identification information for corresponding media content items. When a device is playing media content, the system may perform content identification by generating query fingerprints representing the media content and comparing the query fingerprints to the reference database. For example, the system may match a query fingerprint to a reference fingerprint by identifying which of the reference fingerprints shares the most frames with the query fingerprint using the hash table. In addition, the system may use additional decision criteria to confirm a match, such as fine-grain matching or tracking successive fingerprints over time.

21 Claims, 17 Drawing Sheets

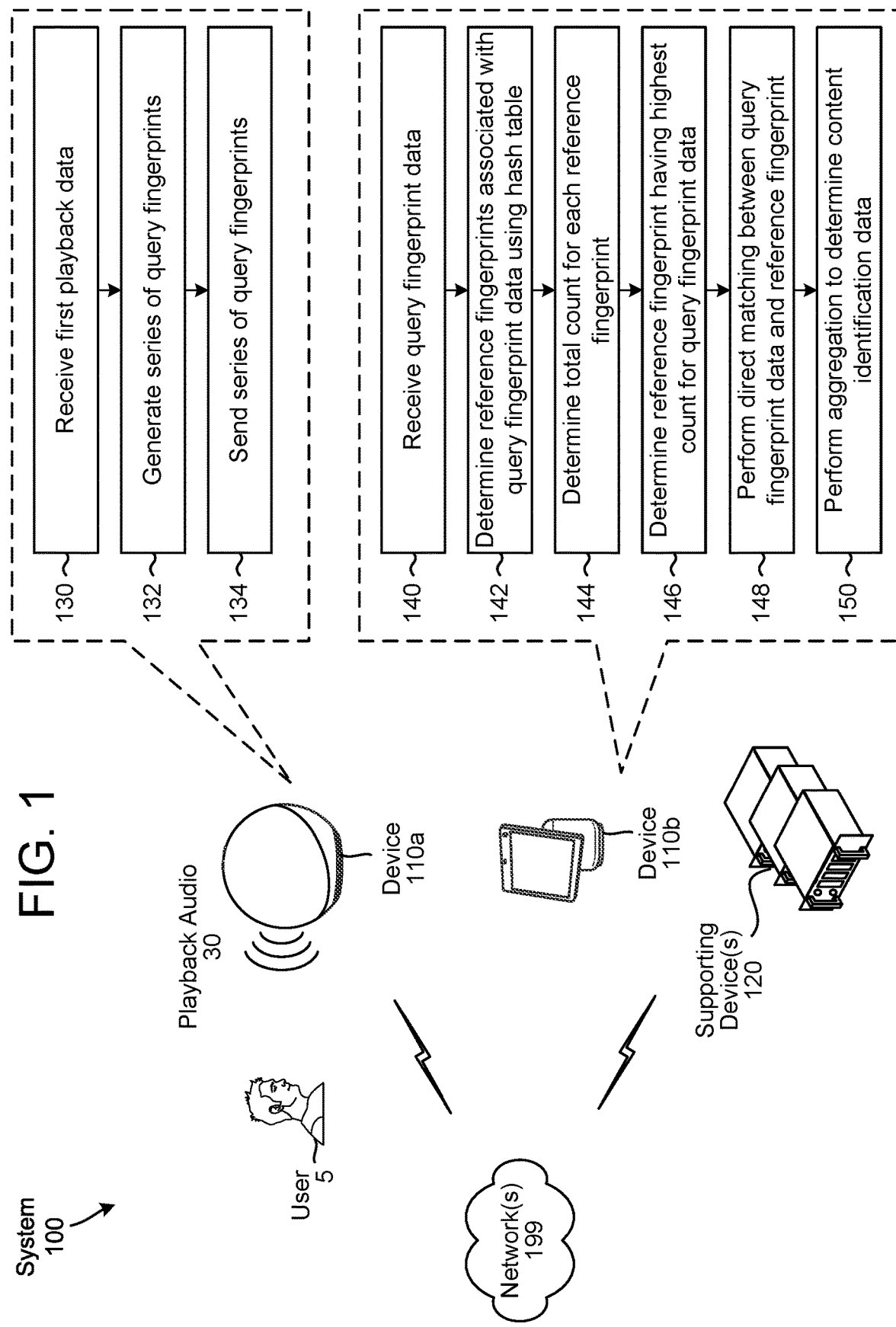

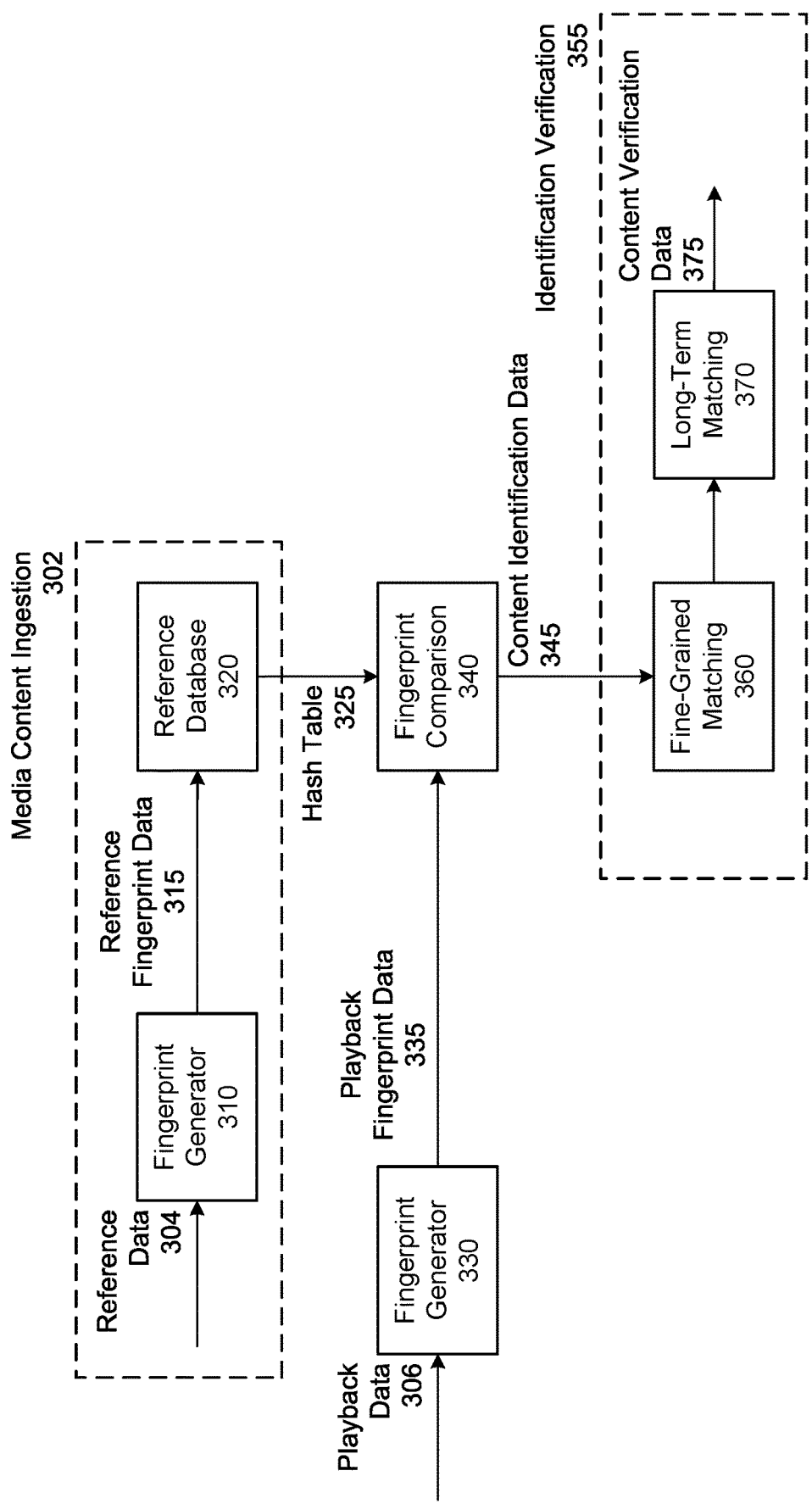

FIG. 4A
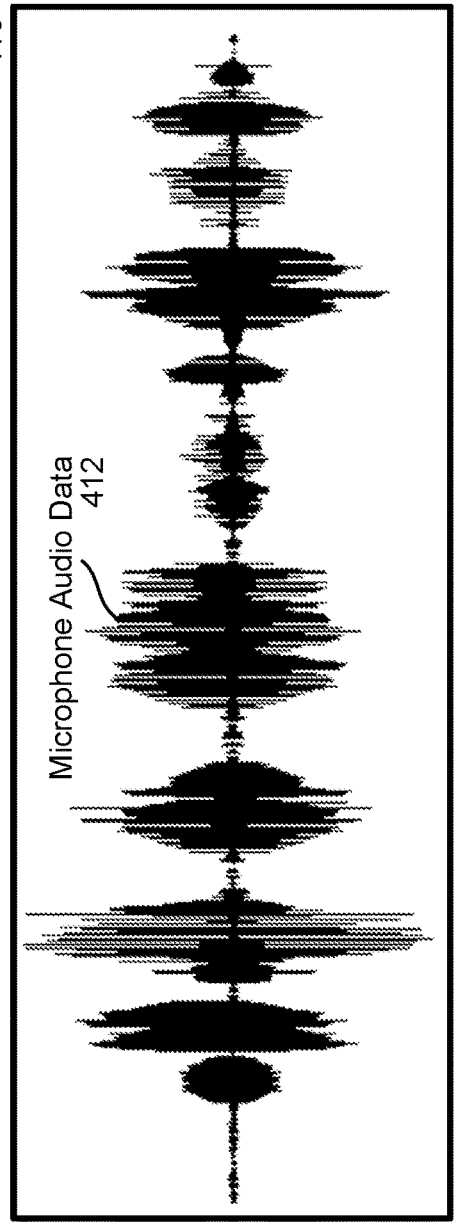
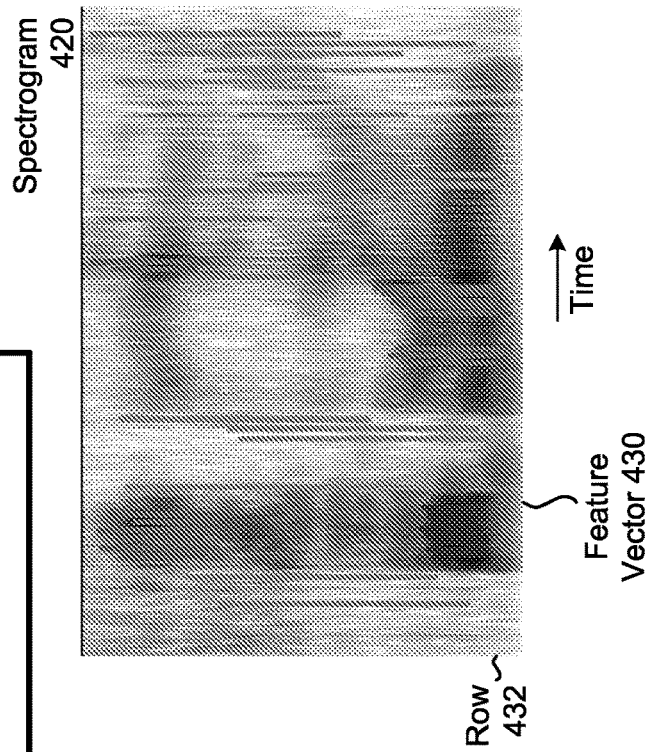

FIG. 4B
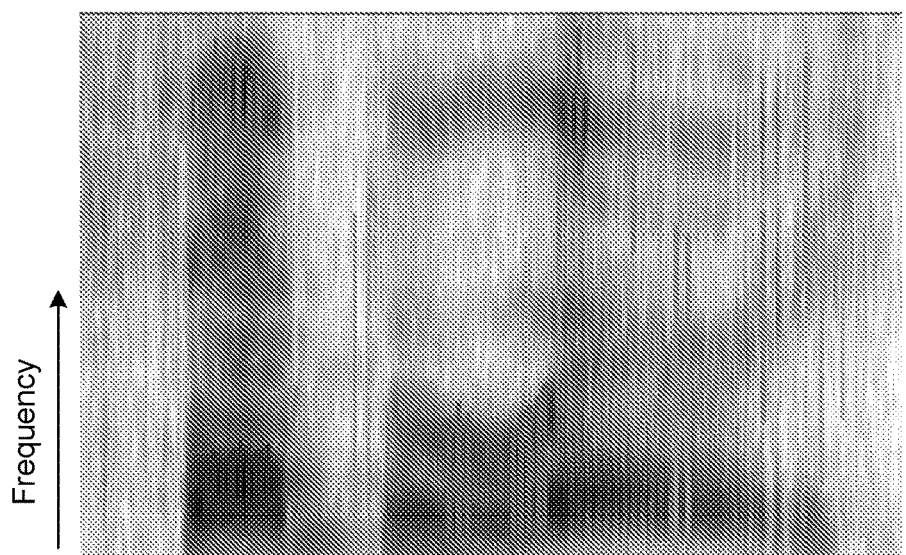
Spectrogram 420
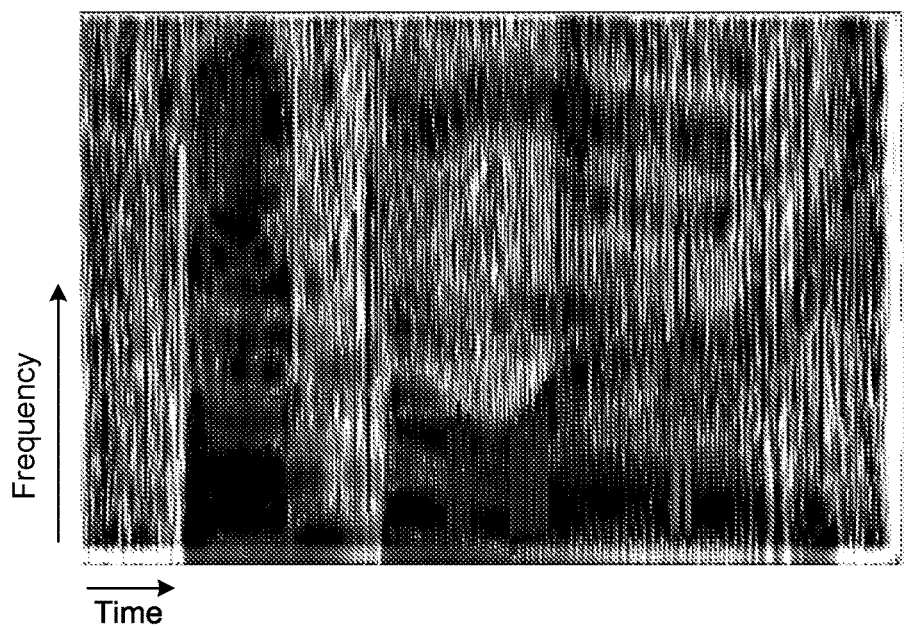
Gradient Energy 440
FIG. 4C
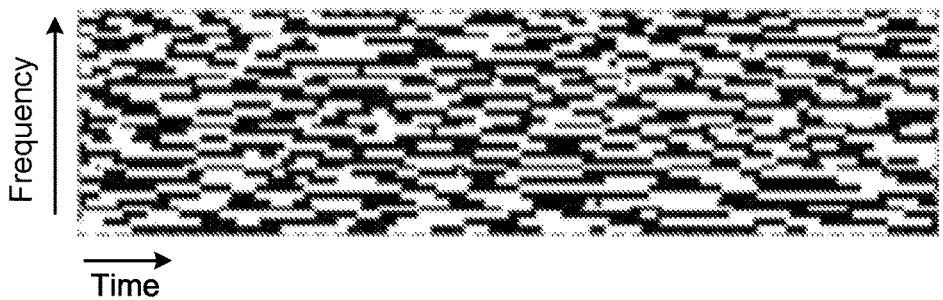
Fingerprint 450

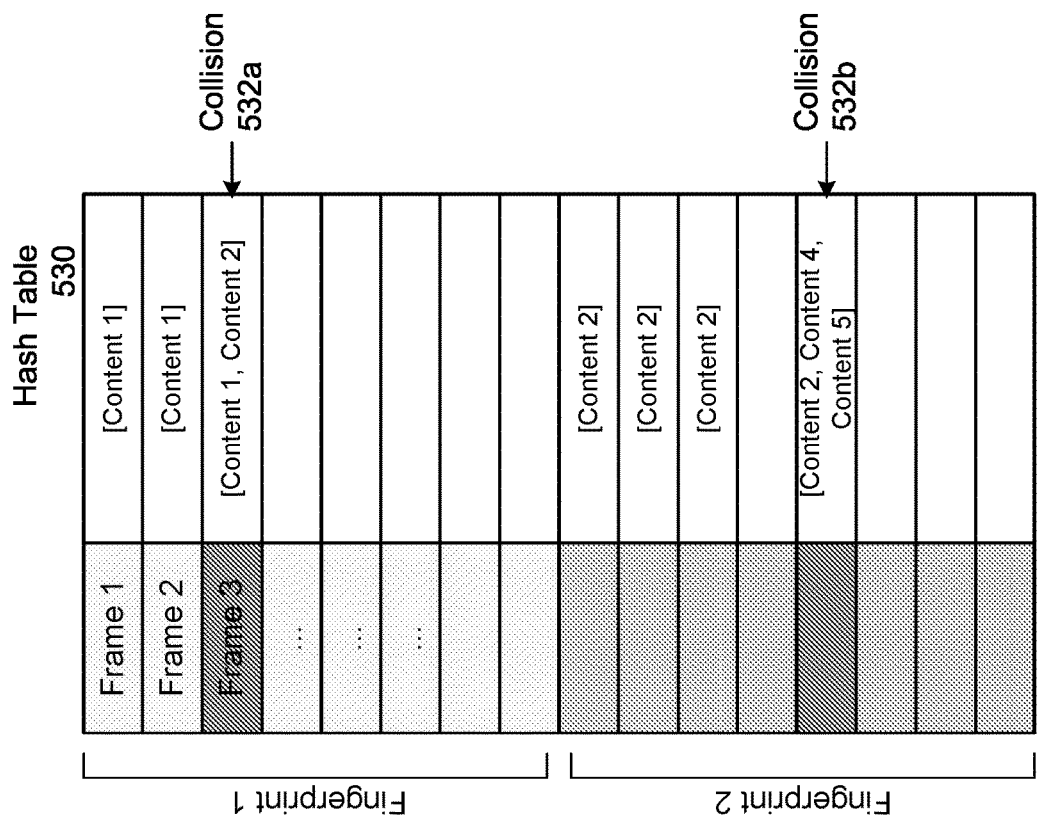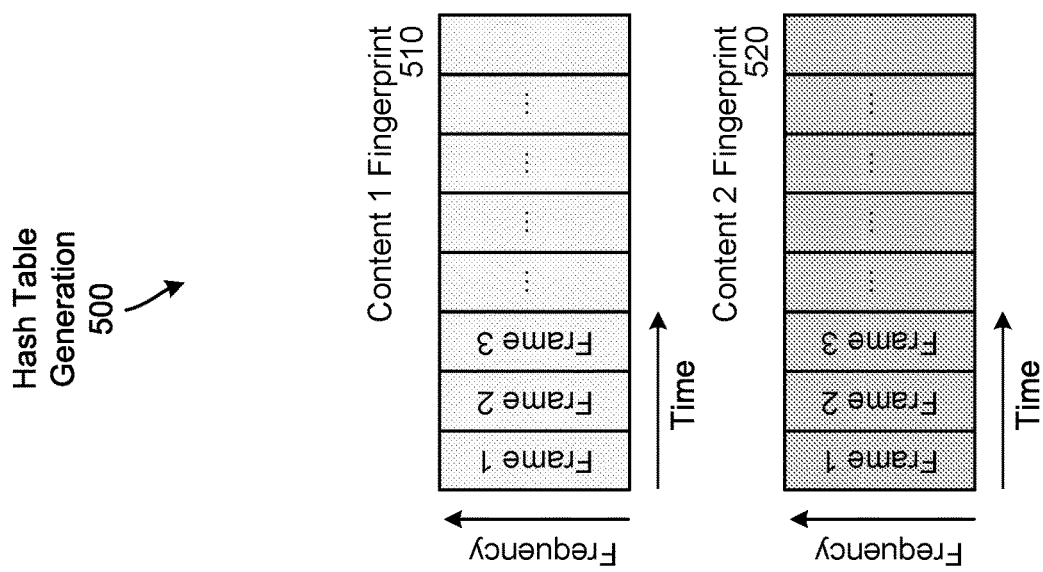
FIG. 5

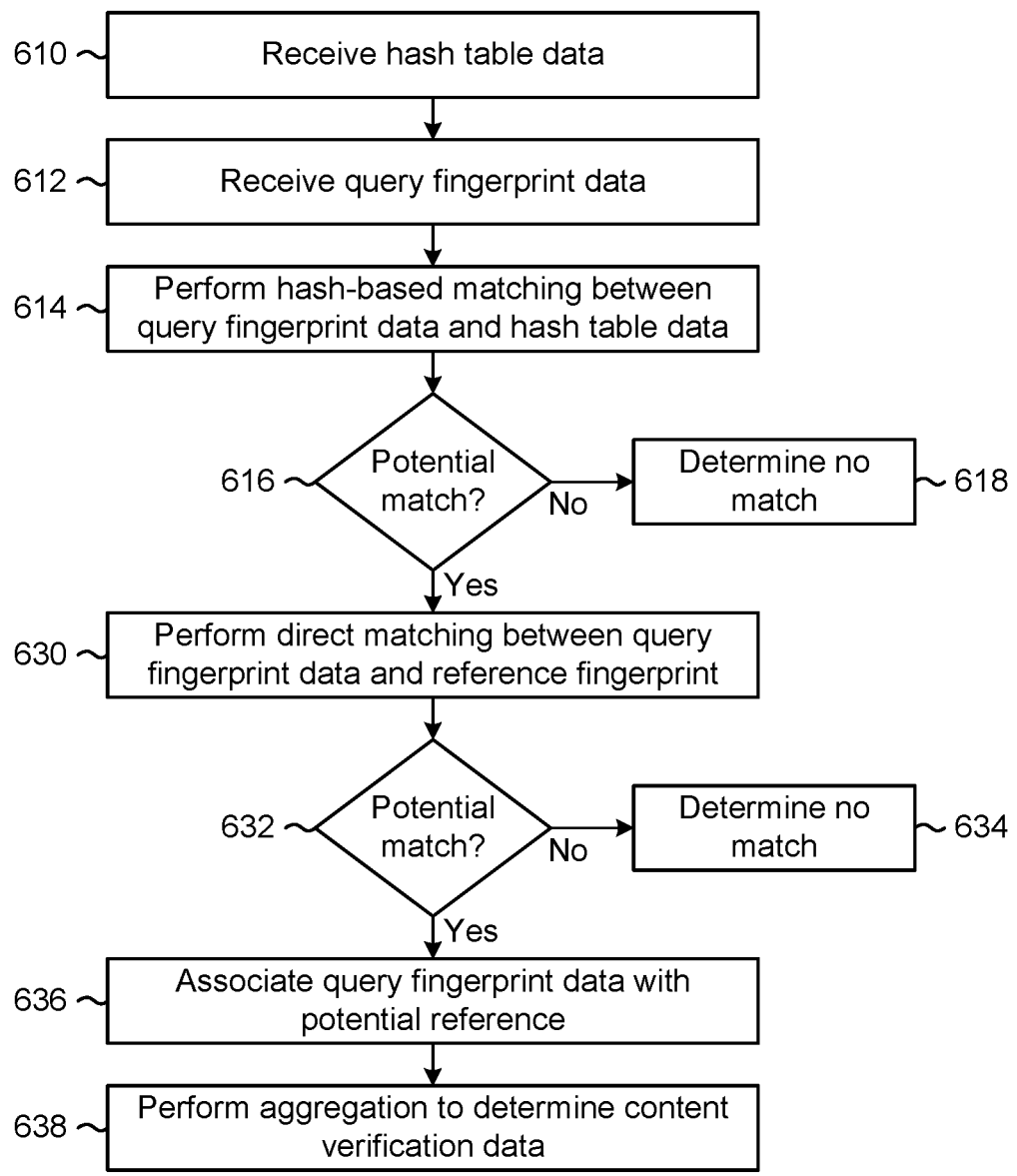

CONTENT IDENTIFICATION USING FINGERPRINTING

BACKGROUND

With the advancement of technology, the use and popularity of electronic devices has increased considerably. Electronic devices are commonly used to generate play media content.

BRIEF DESCRIPTION OF DRAWINGS

For a more complete understanding of the present disclosure, reference is now made to the following description taken in conjunction with the accompanying drawings.

FIG. 1 illustrates a system configured to perform content identification using hash-based fingerprinting according to embodiments of the present disclosure.

FIGS. 3A-3B illustrate example component diagrams for performing content identification using hash-based fingerprinting according to embodiments of the present disclosure.

FIGS. 4A-4C illustrate examples of fingerprints according to embodiments of the present disclosure.

FIG. 5 illustrates an example of a hash table according to embodiments of the present disclosure.

FIGS. 6A-6C are flowcharts conceptually illustrating examples of performing content identification using fingerprints according to embodiments of the present disclosure.

DETAILED DESCRIPTION

Figure 2A:
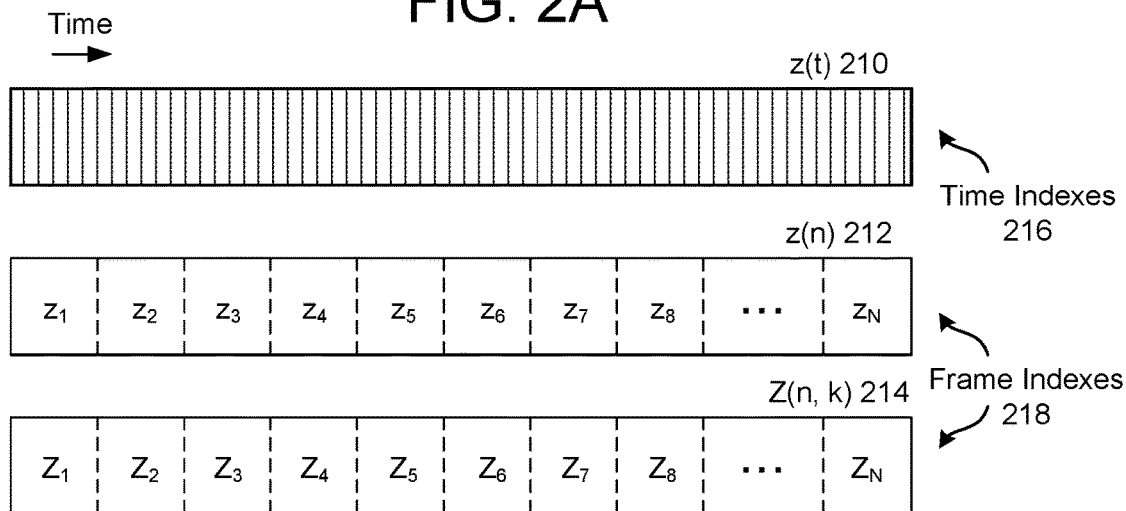
FIGS. 2A-2D illustrate examples of frame indexes, tone indexes, and channel indexes.

Electronic devices may be used to output media content to a user. For example, a device may be configured to receive playback audio data and generate playback audio using one or more loudspeakers. Additionally or alternatively, the device may be configured to receive image data representing a video and output the video on a display of the device. Thus, the device may play media content (e.g., music, television show, movie, etc.) for the user using the loudspeakers and/or the display.

In certain configurations it may be desirable to keep a log of or otherwise store data related to the content that a one or more devices played, where the data is generated at or near time of playback (e.g., between decoding and presentation of the content using an output component). Such a content log may be useful for a number of purposes, for example, ensuring that child and/or employee devices are only outputting approved content, determining which advertisements are output at what times and by what devices, determining types of content being consumed, determining popularity of individual pieces of content, providing enhanced context for an ambient system, such as Amazon's Alexa, among other things. Offered are techniques and systems for systematic techniques of determining content that is actually output by a device, which may more accurately/more precisely perform such operations than systems that may track based on what content is sent to a device. Discussed herein include techniques for determining fingerprints of content output by a device, routing such fingerprints to match them to specific content instances, organizational techniques for managing resulting information, and the like.

To improve a customer experience and provide additional functionality, devices, systems and methods are disclosed that perform content identification using fingerprinting to identify known media content. For example, the system may generate a reference database of the known media content by generating reference fingerprints for each media content item to include in the content identification. In addition, the system may generate a hash table that associates individual frames of the reference fingerprints with identification information for corresponding media content items. When a device is playing media content, the system may perform content identification by generating a continuous stream of query fingerprints and comparing the query fingerprints to the reference database. For example, an individual query fingerprint may represent a short duration of the media content and the system may match the query fingerprint to a reference fingerprint by identifying which of the reference fingerprints shares the most frames with the query fingerprint. The system may use the hash table to quickly identify the reference fingerprints associated with each frame of the query fingerprint. In addition, the system may use additional decision criteria to confirm a match, such as fine-grain matching or tracking successive fingerprints over time.

FIG. 1 illustrates a high-level conceptual block diagram of a system 100 configured to perform content identification using hash-based fingerprinting according to embodiments of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110a and a device 110b which may be communicatively coupled to network(s) 199 and/or supporting device(s) 120, although the disclosure is not limited thereto.

The devices 110a and 110b may be an electronic device configured to capture and/or receive audio data. For example, the devices 110 may include a microphone array configured to generate audio data, although the disclosure is not limited thereto and the devices 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the devices 110 may be configured to receive playback audio data and generate playback audio (e.g., output audio) using one or more loudspeakers of the devices 110. For example, the device 110 may generate playback audio corresponding to media content, such as music, a movie, and/or the like.

As part of outputting media content, the device 110a may generate playback audio 30 for the user 5 and/or play a video on a display of the device 110a, although the disclosure is not limited thereto. In order to enable additional functionality, in some examples the system 100 may perform content identification to determine the media content being output by the device 110a. For example, identifying the media content may enable enhanced entity resolution, which allows the system 100 to interpret voice commands based on the specific media content being output to the user.

While the system 100 may perform content identification to enable additional functionality, the system 100 may limit content identification based on privacy controls associated with each user profile. For example, privacy preferences associated with an individual user profile may control types of media content on which the system 100 may perform content identification, the type and/or amount of data that can be used to perform content identification, which type of information should be anonymized and/or aggregated, and/or the like. Thus, the system 100 may provide additional functionality to user profiles that enable the additional functionality, while disabling the additional functionality to user profiles that have strict privacy settings or the like.

In addition, the system 100 may be limited in the specific media content that the system 100 can recognize as content identification can only be performed for known media content, which was previously processed and stored in a reference database. For example, in order to perform content identification, the system 100 must first generate a reference database including any reference fingerprints with which the system 100 intends to match as part of identifying media content. Thus, the system 100 may be configured to perform content identification using only specific media content that is owned by, licensed to, and/or made available to the system 100 by content providers. In some examples, the system 100 may include multiple reference databases, such that an individual reference database corresponds to a single content provider, in order to separate media content and/or reference fingerprints associated with different content providers.

As illustrated in FIG. 1, the system 100 may perform content identification using fingerprinting to recognize known media content. For example, the system 100 may generate a reference database of known media content by generating reference fingerprints for each media content item to include in the content identification. In addition, the system may generate a hash table that associates individual frames of the reference fingerprints with identification information for corresponding media content items, as described in greater detail below with regard to FIG. 5. When the device 110a is playing media content, the system 100 may perform content identification by generating a continuous stream of query fingerprints and comparing the query fingerprints to the reference database. For example, an individual query fingerprint may represent a short duration of the media content and the system 100 may match the query fingerprint to a reference fingerprint by identifying which of the reference fingerprints shares the most frames with the query fingerprint. In some examples, the system 100 may use the hash table to quickly identify the reference fingerprints associated with each frame of the query fingerprint. In addition, the system 100 may use additional decision criteria to confirm a match, such as fine-grain matching or tracking successive fingerprints over time.

As illustrated in FIG. 1, the device 110a may receive (130) first playback data, may generate (132) a series of query fingerprints, and may send (134) the series of query fingerprints to another device 110b and/or the supporting device(s) 120. In some examples, the device 110a may generate the series of query fingerprints having a first length (e.g., 4 seconds). For example, the device 110a may divide the first playback data into a plurality of segments (e.g., using continuous time windows, such that each segment corresponds to 4 seconds of the first playback data) and generate the series of query fingerprints, with each segment of the first playback data represented as a unique query fingerprint. However, the disclosure is not limited thereto and a length of the query fingerprints may vary without departing from the disclosure. As described in greater detail below with regard to FIG. 3A, the system 100 may generate the query fingerprints using audio data, image data, a combination of audio data and image data, and/or the like without departing from the disclosure.

The content identification operations 140-150 are illustrated as performed by at least one of another device 110b and/or supporting device(s) 120, though they may be performed, in certain configurations, by device 110a and/or by another system component. For ease of illustration, these operations are described as being performed by supporting device(s) 120 though the system 100 is not necessarily so limited. As illustrated in FIG. 1, the supporting device(s) 120 may receive (140) query fingerprint data representing one or more query fingerprints from the device 110 and may determine (142) reference fingerprints associated with the query fingerprint data using a hash table. For example, the supporting device(s) 120 may select a single query fingerprint comprising a plurality of frames and use the hash table to identify reference fingerprints associated with the plurality of frames. The supporting device(s) 120 may determine (144) a total count for each reference fingerprint (e.g., number of shared frames that are associated with both the query fingerprint and the reference fingerprint) and determine (146) a reference fingerprint having a highest count for the query fingerprint data. Thus, in some examples the supporting device(s) 120 may perform content identification based on a frequency of occurrence of the reference fingerprints relative to the plurality of frames. For example, the supporting device(s) 120 may identify a reference fingerprint that is associated with a highest number of frames included in the query fingerprint.

To improve an accuracy of the content identification, the supporting device(s) 120 may perform (148) direct matching between the query fingerprint data and the reference fingerprint having the highest count. For example, the supporting device(s) 120 may reduce a number of false matches by performing a direct comparison, in which the query fingerprint is matched to the entire content of the reference fingerprint and/or media content item associated with the reference fingerprint.

In some examples, the supporting device(s) 120 may further improve an accuracy of the content identification by matching a series of query fingerprints over time. As illustrated in FIG. 1, the supporting device(s) 120 may perform (150) aggregation to determine content identification data corresponding to a media content item that matches two or more consecutive query fingerprints. For example, requiring that the media content item matches multiple consecutive query fingerprints increases a likelihood that the media content item corresponds to the media content being output by the device 110.

While FIG. 1 illustrates an example in which the system 100 performs direct matching prior to performing aggregation, the disclosure is not limited thereto. In some examples, the system 100 may perform aggregation prior to performing direct matching without departing from the disclosure. For example, performing direct matching (e.g., fine-grain matching) may be processing intensive and may require greater processing consumption to be completed. Thus, performing aggregation (e.g., step 150) prior to performing direct matching (e.g., step 148) may reduce the processing consumption required to determine content identification data as it avoids performing direct matching unless multiple query fingerprints correspond to the same media content item. Additionally or alternatively, the system 100 may determine content identification data by performing direct matching without performing aggregation or by performing aggregation without performing direct matching without departing from the disclosure.

In some examples, the supporting device(s) 120 may generate content identification data indicating a single media content item corresponding to the first playback data. For example, the supporting device(s) 120 may determine the media content item having a highest frequency of occurrence within the plurality of frames included in the query fingerprint, as illustrated in FIG. 1. However, the disclosure is not limited thereto, and in other examples the supporting device(s) 120 may vary a number of media content items included in the content identification data without departing from the disclosure. For example, the supporting device(s) 120 may generate the content identification data to include an n-best list (e.g., top 3 media content items), a variable number of media content items having a frequency above a threshold value, and/or the like without departing from the disclosure.

Additionally or alternatively, while FIG. 1 illustrates an example in which the system 100 selects the reference fingerprint having the most shared frames (e.g., highest total count) of the potential reference fingerprints, the disclosure is not limited thereto. In some examples, the system 100 may only select the reference fingerprint having the most shared frames if the reference fingerprint satisfies a condition, such as the number of shared frames exceeds a threshold value (e.g., minimum number of shared frames) and/or the like. Thus, in some examples the system 100 may determine that none of the reference fingerprints match the query fingerprint if the highest total count does not exceed the threshold value without departing from the disclosure.

In some examples, an individual reference fingerprint may correspond to an entirety of the media content item. For example, a first media content item (e.g., first content) may have a first length (e.g., 30 seconds) and may correspond to a first reference fingerprint that has the first length and represents the first media content item. Thus, a plurality of query fingerprints representing portions of the first media content item may be associated with the first reference fingerprint without departing from the disclosure. However, the disclosure is not limited thereto, and in other examples the media content item may correspond to a plurality of reference fingerprints without departing from the disclosure. For example, a second media content item (e.g., second content) may have the first length and may correspond to a plurality of reference fingerprints having a second length (e.g., 4 seconds), with each reference fingerprint of the plurality of reference fingerprints representing a respective portion of the second media content item. Thus, a single query fingerprint representing a first portion of the second media content may be associated with a single reference fingerprint of the plurality of reference fingerprints that represents the first portion of the second media content item without departing from the disclosure.

In the first example described above, the system 100 may determine that the query fingerprint is associated with a single reference fingerprint that corresponds to the first media content item. Thus, each of the reference fingerprints identified in steps 142-146 may correspond to distinct media content items, with the highest count indicating a specific media content item that includes the most shared frames with the query fingerprint. However, in the first example, the system 100 is unable to determine which portion of the first media content item is represented by the query fingerprint.

In contrast, in the second example described above, the system 100 may determine that the query fingerprint is associated with one or more reference fingerprints that correspond to the second media content item. Thus, several of the reference fingerprints identified in steps 142-146 may correspond to the same media content item (e.g., second media content item), with the highest count indicating the specific reference fingerprint that includes the most shared frames with the query fingerprint. While the second example increases a number of reference fingerprints associated with a single query fingerprint, it enables the system 100 to determine the specific portion of the second media content item that is represented by the query fingerprint.

The granularity enabled by the second example described above may be useful as it enables the system 100 to distinguish between two versions of the same media content item. For example, the second media content item (e.g., second content) may have the first length and may correspond to a first plurality of reference fingerprints having the second length (e.g., 4 seconds), while a third media content item (e.g., third content) may be an extended version of the second media content item. Thus, the third media content item may have a third length (e.g., 60 seconds) and may correspond to the first plurality of reference fingerprints and a second plurality of reference fingerprints. In this example, the system 100 may determine that the query fingerprint corresponds to a specific reference fingerprint and, by matching a series of query fingerprints to respective reference fingerprints, the system 100 may distinguish between the second media content item and the third media content item. For example, while the system 100 may determine that a query fingerprint corresponds to the same number of reference fingerprints associated with the second media content item and the third media content item, the system 100 may determine that the series of query fingerprints only corresponds to the first plurality of reference fingerprints. As the first plurality of reference fingerprints represents the second media content item in its entirety but only a first portion of the third media content item, the system 100 may generate content identification data associating the series of query fingerprints with the second media content item.

While the second example described above illustrates one example in which the system 100 may distinguish between two versions of the same media content item using a series of query fingerprints (e.g., aggregation), the disclosure is not limited thereto. In other examples, the system 100 may distinguish between two versions of the same media content item by performing direct matching without departing from the disclosure. As described in the first example above, the first media content item (e.g., first content) may have the first length (e.g., 30 seconds) and may correspond to the first reference fingerprint having the first length and representing the first media content item in its entirety. Thus, a plurality of query fingerprints representing portions of the first media content item may be associated with the first reference fingerprint without departing from the disclosure.

To perform direct matching, the system 100 may shift the query fingerprint, which has a second length (e.g., 4 seconds), across the entire first length of the first media content item. For example, the system 100 may compare the query fingerprint with a first portion of the first reference fingerprint, compare the query fingerprint with a second portion of the first reference fingerprint (e.g., shifting by two frames, although the disclosure is not limited thereto), and so on, until the system 100 has compared the query fingerprint to every possible portion of the first reference fingerprint. Based on these comparisons, the system 100 may determine whether the query fingerprint corresponds to the first reference fingerprint or whether it is a false positive (e.g., despite having a number of shared frames, the query fingerprint does not correspond to the first media content item). However, if the system 100 determines that the query fingerprint corresponds to the first reference fingerprint, the system 100 may determine that the query fingerprint is associated with a specific portion of the first reference fingerprint and/or the first media content item based on the direct matching.

To illustrate an example, the system 100 may compare the query fingerprint with the first reference fingerprint by calculating a bit error rate (BER) as the query fingerprint is shifted across the first reference fingerprint. For example, the system 100 may determine a first bit error rate between the query fingerprint and the first portion of the first reference fingerprint, may determine a second bit error rate between the query fingerprint and the second portion of the first reference fingerprint, and so on. The bit error rates indicate a number of bits that are different between the query fingerprint and the corresponding portion of the first reference fingerprint (e.g., non-matching bits), which can be used to determine which portion of the first reference fingerprint matches the query fingerprint. To illustrate an example, the system 100 may determine that the query fingerprint matches a portion of the first reference fingerprint when the bit error rate drops below a threshold value (e.g., 10%), indicating that fewer than 10% of the bits are different (e.g., 90%+ of the bits are identical), although the disclosure is not limited thereto. Based on the results of the direct matching, the system 100 may determine which portion of the first media content item corresponds to the query fingerprint and determine the content identification data, which may distinguish between different versions of the same media content item.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

FIGS. 2A-2D illustrate examples of frame indexes, tone indexes, and channel indexes. As described above, the device 110 may generate microphone audio data z(t) using microphone(s). For example, a first microphone may generate first microphone audio data $z1(t)$ in the time-domain, a second microphone may generate second microphone audio data $z2(t)$ in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z (n, k) 214 in the frequency-domain. As used herein, a variable Z (n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z (n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z (n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z (n, k) 216 in the frequency-domain). For example, the system 100 may apply FFT processing to the time-domain microphone audio data z(n) 212, producing the frequency-domain microphone audio data Z (n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
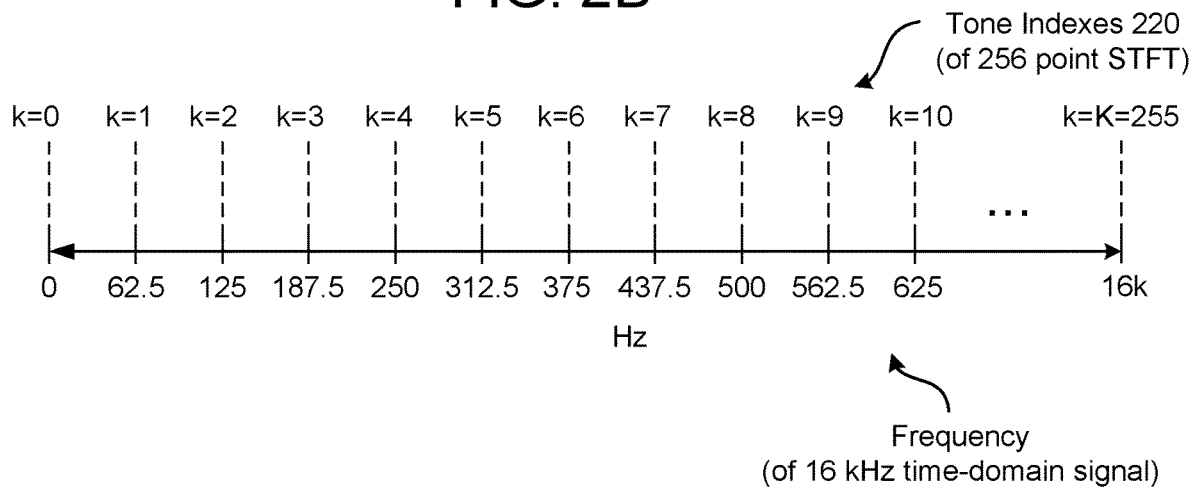

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
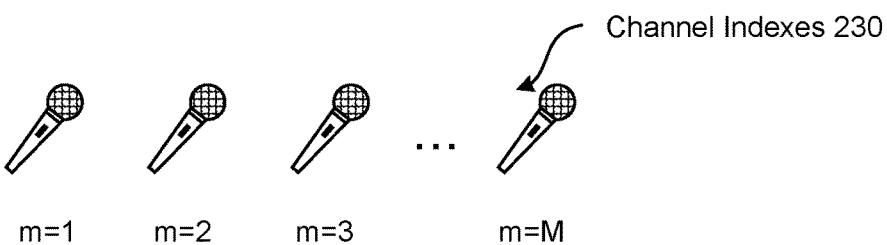

The system 100 may include multiple microphones, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M≥1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data $z1(n)$ associated with a first microphone to no longer be synchronized with second microphone audio data $z2(n)$ associated with a second microphone. Thus, the device 110 may instead modify only the playback audio data x(n) so that the playback audio data x(n) is synchronized with the first microphone audio data $z1(n)$.

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
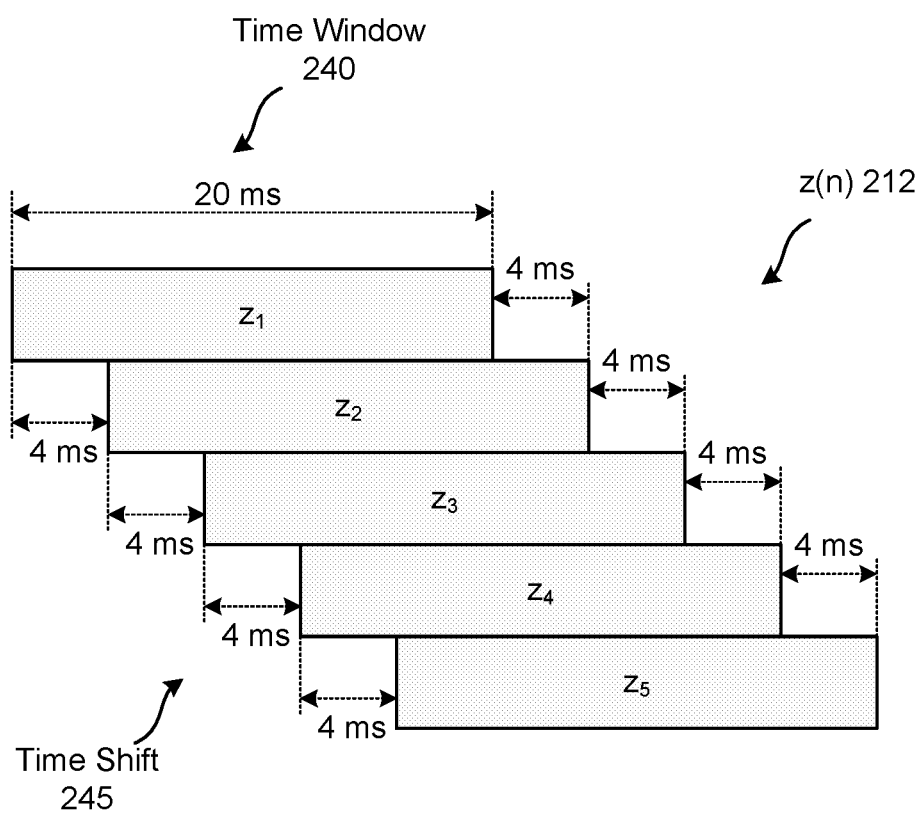

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

Figure 3A:
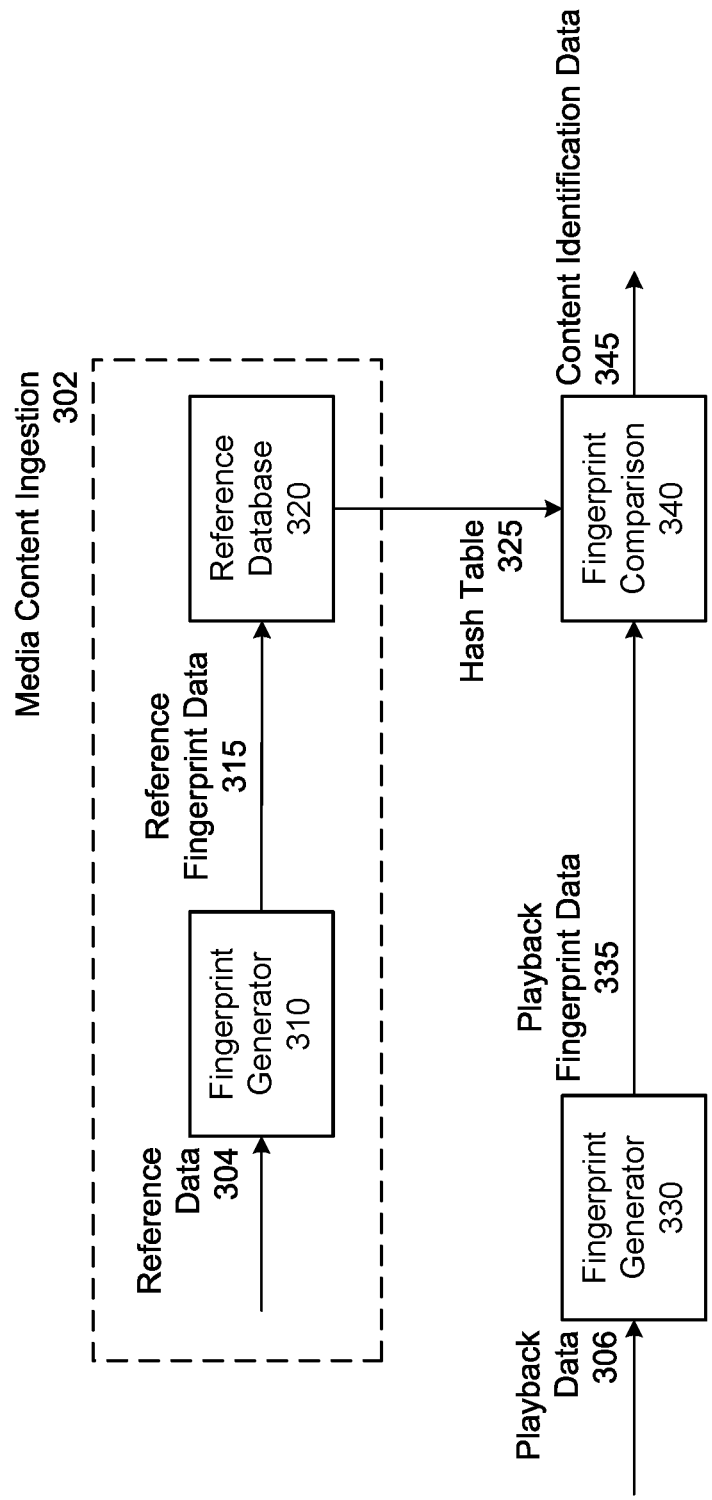

FIGS. 3A-3B illustrate example component diagrams for performing content identification using hash-based fingerprinting according to embodiments of the present disclosure. As described above, the system 100 may limit content identification based on privacy controls associated with each user profile. For example, privacy preferences associated with an individual user profile may control types of media content on which the system 100 may perform content identification, the type and/or amount of data that can be used to perform content identification, which type of information should be anonymized and/or aggregated, and/or the like. Thus, the system 100 may provide additional functionality to user profiles that enable the additional functionality, while disabling the additional functionality to user profiles that have strict privacy settings or the like. To illustrate an example of additional functionality, the system 100 may perform content identification to enable enhanced entity resolution, which allows the system 100 to interpret voice commands based on the specific media content being output to the user.

In addition, the system 100 is limited in the specific media content that the system 100 can recognize as content identification can only be performed for media content that was previously processed and stored in a reference database. For example, in order to perform content identification, the system 100 must first generate the reference database including any reference fingerprints with which the system 100 intends to match as part of identifying media content. Thus, the system 100 may be configured to perform content identification using only specific media content that is owned by, licensed to, and/or made available to the system 100 by content providers. In some examples, the system 100 may include multiple reference databases, such that an individual reference database corresponds to a single content provider, in order to separate media content and/or reference fingerprints associated with different content providers.

In the fingerprint matching 300 example illustrated in FIG. 3A, media content ingestion 302 illustrates the process by which the system 100 may generate the reference database(s) 320. As illustrated in FIG. 3A, a first fingerprint generator component 310 may receive reference data 304 representing media content (e.g., a particular media content item) and the first fingerprint generator component 310 may generate reference fingerprint data 315 that includes reference fingerprints corresponding to the media content. The first fingerprint generator component 310 may send the reference fingerprint data 315 to a reference database 320, which may be configured to store the reference fingerprint data 315 and/or information generated using the reference fingerprint data 315 (e.g., hash table, hash keys, hash codes or hash values, and/or the like).

To illustrate an example, the first fingerprint generator component 310 may receive reference data 304 having a first length (e.g., 30 seconds) and may generate reference fingerprint data 315 including a series of reference fingerprints having a second length (e.g., 4 seconds). For example, the first fingerprint generator component 310 may divide the reference data 304 into a plurality of segments (e.g., using continuous time windows, such that each segment corresponds to 4 seconds of the reference data 304) and generate the series of reference fingerprints, with each segment of the reference data 304 represented as a unique reference fingerprint. However, the disclosure is not limited thereto and a length of the reference data 304 and/or a length of the reference fingerprints may vary without departing from the disclosure. For example, the reference data 304 may have a variable length (e.g., one minute, 30 minutes, 60 minutes, etc.) without departing from the disclosure and/or the first fingerprint generator component 310 may generate reference fingerprints having a fourth length (e.g., 6 seconds) without departing from the disclosure.

While the example described above refers to generating reference fingerprint data 315 for a single media content item, the disclosure is not limited thereto and the system 100 may perform media content ingestion 302 for a plurality of media content items without departing from the disclosure. For example, the reference database 320 illustrated in FIG. 3A may include reference fingerprint data 315 for hundreds or thousands of media content items without departing from the disclosure. Additionally or alternatively, the system 100 may include a plurality of reference databases 320 without departing from the disclosure.

The system 100 may perform media content ingestion 302 individually for each media content item (e.g., as the media content items are ingested), using batch processing (e.g., processing multiple media content items together), and/or the like without departing from the disclosure. Thus, in some examples the system 100 may perform media content ingestion 302 for a plurality of media content items during a period of time (e.g., initialization step), while in other examples the system 100 may perform media content ingestion 302 repeatedly over time, although the disclosure is not limited thereto.

In some examples, the media content processed during media content ingestion 302 may correspond to an audio clip and the reference fingerprints may represent audio data associated with the audio clip. For example, the reference data 304 may correspond to the audio data (e.g., representing audio signals, audio waveforms, and/or the like), and the reference fingerprint data 315 may correspond to reference fingerprints that include audio features representing the audio data. In other examples, the media content processed during media content ingestion 302 may correspond to a video clip and the reference fingerprints may represent audio data associated with the video clip. For example, the reference data 304 may correspond to audio data included in the video clip, and the reference fingerprint data 315 may correspond to reference fingerprints that include audio features representing the audio data.

While the above description illustrates examples in which the reference fingerprints are generated using audio data, the disclosure is not limited thereto. Instead, the reference fingerprints may correspond to any type of fingerprint or data structure and/or may represent any type of data without departing from the disclosure. Thus, in some examples the reference fingerprints may represent image data without departing from the disclosure. To illustrate an example, the media content processed during media content ingestion 302 may correspond to a video clip and the reference fingerprints may represent image data associated with the video clip. For example, the reference data 304 may correspond to image data included in the video clip, and the reference fingerprint data 315 may correspond to reference fingerprints that include image features representing the image data, although the disclosure is not limited thereto.

In some examples, the image data may correspond to a plurality of image frames, with a first image frame including first pixel values (e.g., first intensity values) representing a first image, a second image frame including second pixel values (e.g., second intensity values) representing a second image, and so on. Thus, a first pixel associated with first pixel coordinates may correspond to first values (e.g., $RGB_1$) of the first pixel values, second values (e.g., $RGB_2$) of the second pixel values, and so on for each of the plurality of image frames. Similarly, a second pixel associated with second pixel coordinates may correspond to third values (e.g., $RGB_3$) of the first pixel values, fourth values (e.g., $RGB_4$) of the second pixel values, and so on for each of the plurality of image frames. As described in greater detail below, the system 100 may generate reference fingerprints by determining image features representing the image data. For example, the system 100 may generate a first reference fingerprint including first image features corresponding to the first image frame (e.g., extracted from and/or representing the first pixel values), a second reference fingerprint including second image features corresponding to the second image frame (e.g., extracted from and/or representing the second pixel values), and/or the like, although the disclosure is not limited thereto.

Additionally or alternatively, the reference data 304 may correspond to both image data and audio data without departing from the disclosure. For example, the reference data 304 may include image data and audio data associated with the video clip, and the reference fingerprint data 315 may represent each segment of the reference data 304 using either (i) a first reference fingerprint that includes image features representing the image data along with audio features representing the audio data, or (ii) a second reference fingerprint that includes image features representing the image data along with a third reference fingerprint that includes audio features representing the audio data.

While the examples described above refer to the reference fingerprint data 315 representing audio data and/or image data, the disclosure is not limited thereto and the reference fingerprint data 315 may correspond to any type of data without departing from the disclosure. Additionally or alternatively, while the examples described herein may refer to generating a reference fingerprint, the disclosure is not limited thereto and the system 100 may generate any type of data structure without departing from the disclosure. For example, the system 100 may generate any reference data that summarizes and/or represents characteristic components of input data without departing from the disclosure. Thus, the system 100 may map an arbitrarily large data item to a much shorter representation, which uniquely identifies the original data, and for ease of illustration the shorter representation may be referred to as a fingerprint.

In some examples, the system 100 may generate fingerprints using techniques that correspond to high-performance hash functions, which may be used to uniquely identify substantial blocks of data. However, the disclosure is not limited thereto, and the system 100 may generate fingerprints using other techniques without departing from the disclosure. Additionally or alternatively, the system 100 may apply a hash function to the fingerprints without departing from the disclosure, as described in greater detail below.

In some examples, a video fingerprint may correspond to a condensed digital summary, deterministically generated from a video signal, which can be used to identify a video clip or quickly locate similar items in a video database. For example, a video fingerprint may be used to identify media content such as advertisements, video clips, television shows, movies, and/or the like without departing from the disclosure. To generate the video fingerprint, the system 100 may process video data as a series of image frames and may generate feature vector data for each image frame. For example, the feature vector data may include two-dimensional vectors and may represent information such as changes in patterns of image intensity over successive image frames without departing from the disclosure. However, the disclosure is not limited thereto and the feature vector data may include any features or characteristics of the image data without departing from the disclosure. Thus, the system 100 may perform video fingerprinting as a dimension reduction technique in which the system 100 identifies, extracts, and then summarizes characteristic components of a video as a unique or a set of multiple perceptual hashes, enabling the video to be uniquely identified, although the disclosure is not limited thereto.

In some examples, an audio fingerprint (e.g., which may also be referred to as an acoustic fingerprint) may correspond to a condensed digital summary, deterministically generated from an audio signal, which can be used to identify an audio sample or quickly locate similar items in an audio database. For example, an audio fingerprint may be used to identify media content such as songs, melodies, advertisements, video clips, movies, and/or the like without departing from the disclosure. To generate the audio fingerprint, the system 100 may process audio data as a series of overlapping or non-overlapping audio frames and may generate feature vector data for each audio frame.

In some examples, the feature vector data may be represented using two-dimensional vectors and may include information such as energy values in individual frequency ranges without departing from the disclosure. For example, the feature vector data may include a plurality of frames (e.g., 454 frames), with each frame represented as a one-dimensional vector (e.g., 32 values representing energy values in each frequency range), such that the feature vector data has a first size (e.g., 454 columns and 32 rows) without departing from the disclosure. Alternatively, the feature vector data may include a plurality of frequency ranges (e.g., 32 frequency ranges), with each frequency range represented as a one-dimensional vector (e.g., 454 values representing energy values in each frame for the selected frequency range), such that the feature vector data has a second size (e.g., 32 columns and 454 rows) without departing from the disclosure. However, the disclosure is not limited thereto and the feature vector data may include any features or characteristics of the audio data without departing from the disclosure. For example, the audio fingerprint may take into account perceptual characteristics of the audio, such that a first audio fingerprint associated with a first audio sample may match a second audio fingerprint associated with a second audio sample if the first audio sample and the second audio sample sound similar to the human ear. Thus, the feature vector data may include perceptual characteristics or features without departing from the disclosure, and examples of perceptual characteristics may include zero crossing rate, estimated tempo, average spectrum, spectral flatness, prominent tones across a set of frequency bands, bandwidth, and/or the like. As described in greater detail below, the system 100 may apply a hash function to the fingerprints without departing from the disclosure.

FIGS. 4A-4B illustrate examples of fingerprints according to embodiments of the present disclosure. As illustrated in FIG. 4A, an example of playback audio data 412 representing speech is shown as energy chart 410. In some examples, the system 100 may create a time-frequency graph using the playback audio data 412, such as spectrogram 420. For example, the system 100 may generate the spectrogram 420 by splitting the playback audio data 412 into segments over time and plotting the result as a graph that plots the audio using three dimensions: frequency, amplitude, and time. For example, spectrogram 420 represents frequency (e.g., frequency ranges or subbands) along a vertical axis, time (e.g., audio frames) along a horizontal axis, and amplitude (e.g., intensity values) as a color ranging from black (e.g., low intensity value) to white (e.g., high intensity value).

As illustrated in the spectrogram 420, an audio signal may be represented as individual audio frames (e.g., feature vectors corresponding to a time window). For example, a feature vector 430 may be a vertical representation of an individual audio frame that may include a number of harmonics (e.g., horizontal lines in the spectrogram 420). A particular row 432 in a sequence of feature vectors (e.g., element k in each feature vector) may be associated with the same frequency/pitch/harmonic of the audio signal at different points in time.

In some examples, the system 100 may generate an audio fingerprint by determining feature vector data similar to the spectrogram 420 illustrated in FIG. 4A. For example, the feature vector data may represent frequency content (e.g., spectral characteristics) of an individual segment of the reference data 304, which may correspond to a signature or other identification that can be used to match similar audio segments. However, the disclosure is not limited thereto, and in other examples the system 100 may generate an audio fingerprint by determining feature vector data and then extracting relevant features of the audio content from the feature vector data.

To illustrate an example of this distinction, FIG. 4B depicts a spectrogram 420, which is a visual representation of frequency content included in a portion of audio data, such as an individual segment of the reference data 304. For example, the system 100 may generate the spectrogram 420 by determining Log-Filter Bank Energies (LFBE) feature data (e.g., log-mel filter bank energy feature data), Discrete cosine transform (DCT) feature data, and/or other feature data without departing from the disclosure. As illustrated in FIG. 4B, the brighter the intensity values represented in the spectrogram 420, the more acoustic information is present in corresponding frequency ranges of the reference data 304. Thus, in some examples the system 100 may generate an audio fingerprint by ignoring the noise present in other frequency ranges and focusing on these frequency peaks, which contain the most relevant information for this individual segment of the reference data 304. This is illustrated in FIG. 4B as gradient energy 440, which represents an audio fingerprint that includes detailed information for each frame. However, the disclosure is not limited thereto and the system 100 may generate the audio fingerprint using other techniques without departing from the disclosure.

To illustrate another example, in some examples the system 100 may generate the audio fingerprint based on secondary features calculated using the feature vector data, such as changes in intensity values between audio frames, sign of energy differences, and/or the like. For example, FIG. 4C illustrates an example of a fingerprint 450, which the system 100 may generate by determining a 32-bit fingerprint value for every frame. In order to extract a 32-bit fingerprint value for every frame, the system 100 may select 33 non-overlapping frequency bands, which may be included within a desired frequency range (e.g., 300 Hz to 2 kHz, although the disclosure is not limited thereto). In the fingerprint 450 example illustrated in FIG. 4C, the system 100 may determine a sign of energy differences (simultaneously along the time and frequency axes), as shown below:

$$F(n, m) = \begin{cases} 1 & \text{if } E(n, m) - E(n, m+1) - (E(n-1, m) - E(n-1, m+1)) > 0 \\ 0 & \text{if } E(n, m) - E(n, m+1) - (E(n-1, m) - E(n-1, m+1)) \leq 0 \end{cases} \quad [1]$$

where E(n,m) denotes the energy of band m of frame n, and F(n,m) denotes the fingerprint value for the m-th bit of frame n. As illustrated in FIG. 4C, the system 100 may use Equation [1] to generate the fingerprint 450 by extracting 256 subsequent 32-bit values from an excerpt of audio data, with a first logic value (e.g., '0') represented by a black pixel and a second logic value (e.g., '1') represented by a white pixel. However, the disclosure is not limited thereto, and the system 100 may generate the fingerprint using other techniques without departing from the disclosure. For example, the length of the fingerprint 450 may vary without departing from the disclosure.

As illustrated in FIG. 4C, the fingerprint 450 corresponds to a binary representation of the spectrogram 420 and/or gradient energy 440, which reduces an amount of information associated with each frame. For example, the system 100 may perform quantization as part of generating the fingerprint 450, therefore reducing a size of the fingerprint 450 relative to the spectrogram 420 and/or the gradient energy 440. While this reduces a potential number of unique feature vectors, which may result in additional hash collisions (e.g., multiple frames that are represented as distinct feature vectors in the spectrogram 420 and/or the gradient energy 440 may be represented using a single feature vector in the fingerprint 450), performing quantization may improve performance of the system 100 by reducing a processing consumption associated with performing content identification.

While the fingerprint 450 illustrates a binary representation of the audio fingerprint, the disclosure is not limited thereto. In some examples, the system 100 may generate the audio fingerprint based on the spectrogram 420 and/or the gradient energy 440 without departing from the disclosure. For example, the system 100 may generate the audio fingerprint based on feature vectors 430 (e.g., vertical columns of the spectrogram 420 and/or the gradient energy 440), such that the audio fingerprint corresponds to a first number of frames including a second number of values (e.g., 32 separate frequency bands). Thus, the system 100 may identify the audio fingerprint using the first number of frames (e.g., 454 frames) as key values, with each key value having a length equal to the second number (e.g., 32 values). Alternatively, the system 100 may generate the audio fingerprint based on rows 432 (e.g., horizontal rows of the spectrogram 420 and/or the gradient energy 440), such that the audio fingerprint corresponds to a third number of frequency bands (e.g., 32 separate frequency bands) including a fourth number of values (e.g., 454 separate frames). Thus, the system 100 may identify the audio fingerprint using the third number of frequency bands (e.g., 32) as key values, with each key value having a length equal to the fourth number (e.g., 454 values) without departing from the disclosure. However, the disclosure is not limited thereto and the system 100 may generate the audio fingerprint using other techniques without departing from the disclosure.

Referring back to FIG. 3A, the reference database 320 may receive reference fingerprint data 315 corresponding to each media content item with which the system 100 may perform content identification. Using the reference fingerprint data 315, the reference database 320 may generate a hash table 325, an example of which is illustrated in FIG. 5. For example, the reference database 320 may generate the hash table 325 using all of the frames associated with reference fingerprints (e.g., reference fingerprint data 315) as hash keys. In some examples, an individual hash key may correspond to an entry in the hash table 325 that includes identification data (e.g., content identification) indicating a media content item represented by the reference fingerprint that included the frame.

If a hash key is not repeated between media content items, each hash key associated with the hash table 325 corresponds to unique identification data indicating a specific media content item associated with the reference fingerprint. However, the disclosure is not limited thereto, and hash collisions may occur where hash keys are associated with multiple media content items without departing from the disclosure. For example, if the same frame is included in a first reference fingerprint and a second reference fingerprint, the system 100 is unable to distinguish between the two reference fingerprints. Instead, the hash table 325 may associate the hash key corresponding to the frame with both a first media content item corresponding to the first reference fingerprint and a second media content item corresponding to the second reference fingerprint without departing from the disclosure. Thus, the reference database 320 may represent hash collisions in the hash table 325 as a list indicating each media content item that is associated with the particular frame.

In some examples, an individual frame represented in the reference fingerprint data 315 may correspond to a feature vector (e.g., one-dimensional vector) and the reference database 320 may index the hash table 325 using the feature vector as a hash key. For example, the feature vector may represent a first number of values corresponding to the number of frequency ranges (e.g., 32 values), although the disclosure is not limited thereto. To illustrate an example, the reference database 320 may use a hash function to determine a hash code (e.g., hash value) corresponding to the feature vector (e.g., hash key). As used herein, a hash function may be any function that the system 100 can use to map data of arbitrary size to fixed-size values used to index the hash table 325, and the input to the hash function may be referred to as a hash key and the fixed-size value output by the hash function may be referred to as a hash code (e.g., hash value). For example, the hash function may take the feature vector input as a key (e.g., hash key) and may output a hash code that is mapped to the feature vector. Thus, the hash table 325 may store an association between the hash key (e.g., feature vector representing an individual frame of the reference fingerprint), the hash code (e.g., fixed-size value used to index the hash table) mapped to the hash key, and an entry (e.g., datum or record) that indicates identification data (e.g., content identification) for a media content item that corresponds to the reference fingerprint.

As described above, if two or more media content items include the same frame, the feature vector will be identical for both reference fingerprints. In this case, the hash table 325 may store an association between the hash key (e.g., feature vector representing the identical frame), the hash code mapped to the hash key, and an entry that indicates identification data (e.g., content identification) for two or more media content items that include the identical frame.

In some examples, the system 100 may generate the audio fingerprint using Equation [1], as described above, and may process each frame of the audio fingerprint as a hash key. For example, the system 100 may input feature vectors generated using Equation [1] as hash keys to a hash function and receive the hash codes generated by the hash function. However, the disclosure is not limited thereto, and in other examples the system 100 may generate the audio fingerprint as feature vector data similar to the spectrogram 420 and/or the gradient energy 440 without departing from the disclosure. Thus, the system 100 may treat feature vectors of the feature vector data as hash keys and input these feature vectors to the hash function illustrated above as Equation [1] in order to generate the hash codes without departing from the disclosure. Thus, the system 100 may determine hash codes that correspond to 32-bit representations of the feature vectors, as illustrated in fingerprint 450, without departing from the disclosure.

FIG. 5 illustrates an example of performing hash table generation 500 using two reference fingerprints. For example, a first fingerprint 510 (e.g., Content 1. Fingerprint) represents a first reference fingerprint associated with a first advertisement, while a second fingerprint 520 (e.g., Content 2. Fingerprint) represents a second reference fingerprint associated with a second advertisement. For ease of illustration, FIG. 5 only illustrates a single reference fingerprint associated with each advertisement. However, each advertisement may correspond to a series of reference fingerprints without departing from the disclosure. For example, an advertisement having a first length (e.g., 30 seconds) may correspond to a plurality of reference fingerprints having a second length (e.g., 4 seconds), although the disclosure is not limited thereto. In addition, while FIG. 5 illustrates an example of generating a hash table 530 for advertisements, the disclosure is not limited thereto and the system 100 may generate the hash table 530 using any type of media content without departing from the disclosure.

As described above, the system 100 may generate reference fingerprints corresponding to the first media content (e.g., first advertisement) by dividing the first media content into a series of segments having the second length. For example, if the advertisement has the first length (e.g., 30 seconds) and the fixed size for each segment corresponds to the second length (e.g., 4 seconds), the system 100 may divide the first media content into 7.5 non-overlapping reference fingerprints using continuous time windows.

To generate the first fingerprint 510, the system 100 may process one of the segments to determine a plurality of overlapping frames. For example, if the first fingerprint 510 has the second length (e.g., 4 seconds) and the system 100 generates the plurality of overlapping frames using first parameters (e.g., 384 ms frame width, 8 ms frame shift, 33 frequency bins), the system 100 may generate a first number of frames (e.g., 454 frames). However, the disclosure is not limited thereto, and the first length, the second length, the first parameters, and/or the first number of frames may vary without departing from the disclosure.

In some examples, each frame of the first fingerprint 510 may correspond to a feature vector, as described in greater detail above. For example, if the first fingerprint 510 represents audio data, the system 100 may generate a one-dimensional feature vector for each individual frame of the series of frames. Thus, the first fingerprint 510 may correspond to the first number of individual feature vectors without departing from the disclosure. However, the disclosure is not limited thereto and the plurality of frames may be represented using other features and/or data without departing from the disclosure.

As described above, the system 100 may generate the hash table 530 using each unique frame as a hash key. For example, the system 100 may determine the first number of individual feature vectors (e.g., first hash keys) corresponding to the first fingerprint 510 and may use a hash function to determine a first plurality of hash codes that correspond to the first hash keys. Similarly, the system 100 may determine a second number of individual feature vectors (e.g., second hash keys) corresponding to the second fingerprint 520 and may use the hash function to determine a second plurality of hash codes that correspond to the second hash keys.

As described above, a hash table may store an association between a first hash key (e.g., first feature vector), a first hash code mapped to the first hash key, and a first entry that includes identification data (e.g., content identification) for a media content item associated with the first hash code. For ease of illustration, the hash table 530 illustrated in FIG. 5 does not illustrate detailed examples of hash keys and/or hash codes. Instead, the hash table 530 is illustrated with each row corresponding to a unique frame included in the reference fingerprints. For example, the hash table generation 500 example illustrated in FIG. 5 illustrates an example in which a first row of the hash table 530 corresponds to a first frame of the first fingerprint 510 (e.g., Frame 1) and associates the first frame with the first media content (e.g., Content 1). While not illustrated in FIG. 5, the hash table 530 may identify the first frame based on the first feature vector (e.g., first hash key) and/or a first hash code mapped to the first feature vector using the hash function.

Similarly, FIG. 5 illustrates an example in which a second row of the hash table 530 corresponds to a second frame of the first fingerprint 510 (e.g., Frame 2) and associates the second frame with the first media content (e.g., Content 1). Thus, a first feature vector associated with the first row and a second feature vector associated with the second row are unique to the first media content. In contrast, a third row of the hash table 530 corresponds to a third feature vector that is associated with a third frame of the first fingerprint 510 (e.g., Frame 3) and a frame included in the second fingerprint 520. Thus, the third row of the hash table 530 represents a first hash collision 532a and the hash table 530 associates the third feature vector with both the first media content (e.g., Content 1) and the second media content (e.g., Content 2).

As illustrated in FIG. 5, a number of subsequent rows of the hash table 530 correspond to additional frames included in the first fingerprint 510. After a final frame of the first fingerprint 510, the hash table 530 includes a first frame of the second fingerprint 520 and repeats the process, associating each frame of the second fingerprint 520 with the second media content (e.g., Content 2). However, FIG. 5 illustrates a second hash collision 532b in which a frame included in the second fingerprint 520 is also associated with a fourth fingerprint and a fifth fingerprint. Thus, the hash table 530 associates a feature vector corresponding to the second hash collision 532b with the second media content (e.g., Content 2), fourth media content (e.g., Content 4), and fifth media content (e.g., Content 5).

Referring back to FIG. 3A, as described above the system 100 must perform media content ingestion 302 prior to performing content identification. Thus, the system 100 may perform media content ingestion 302 as an initialization step for the reference database 320, while the reference database 320 is offline (e.g., disabling the reference database 320 in order to perform media content ingestion 302 to add reference fingerprints to the hash table 325), while the reference database 320 is online (e.g., performing media content ingestion 302 for individual media content items during run-time), and/or the like without departing from the disclosure. In some examples, the reference database 320 may be associated with a plurality of households and/or businesses and only accessible via extended networks, although the disclosure is not limited thereto.

To perform content identification, a second fingerprint generator component 330 may receive playback data 306 and may generate playback fingerprint data 335 using the techniques described above with regard to the first fingerprint generator component 310. The playback data 306 may correspond to audio data, image data, video data, and/or the like that is being output by the device 110 to the user. For example, the playback data 306 may be received from a playback path configured to generate output audio using loudspeaker(s) associated with the device 110, to display image data on a display associated with the device 110, and/or the like.

To illustrate a simple example, the playback data 306 may correspond to audio data and the second fingerprint generator component 330 may receive the playback data 306 from a playback audio path of the device 110 that is configured to generate playback audio (e.g., output audio) using one or more loudspeaker(s) associated with the device 110. In some examples, the device 110 may receive the audio data via the network(s) 199 while playing media content (e.g., music, audio clip, video clip, television show, movie, etc.). For example, the device 110 may receive the audio data from a content database, remote device, remote system, and/or the like that is not connected to a local area network (LAN) associated with the user profile. However, the disclosure is not limited thereto, and in other examples the device 110 may receive the audio data from a local device connected to the LAN without departing from the disclosure, such as a home server, a media content storage device, a device configured to play media content stored on physical disks, and/or the like. Additionally or alternatively, the device 110 may receive the audio data via the network(s) 199 while participating in a communication session without departing from the disclosure.

As illustrated in FIG. 3A, the second fingerprint generator component 330 may generate the playback fingerprint data 335 representing one or more query fingerprints and may send the playback fingerprint data 335 to a fingerprint comparison component 340. In some examples, the second fingerprint generator component 330 may be included in the device 110 while the fingerprint comparison component 340 may be included in the supporting device(s) 120, although the disclosure is not limited thereto. In other examples, however, the second fingerprint generator component 330 and the fingerprint comparison component 340 may be included in the device 110 without departing from the disclosure.

As described in greater detail above with regard to the reference fingerprint data 315, the system 100 may generate fingerprints using audio data, image data, a combination of audio data and image data, and/or the like without departing from the disclosure. Thus, the second fingerprint generator component 330 may generate playback fingerprint data 335 that includes query fingerprints representing audio data, image data, a combination of audio data and image data, and/or the like without departing from the disclosure. In some examples, the device 110 may determine the type of data represented by the playback fingerprint data 335 and may route and/or process the playback fingerprint data 335 accordingly. For example, the device 110 may send first playback fingerprint data 335a representing audio data to a first fingerprint comparison component 340a while sending second playback fingerprint data 335b representing image data to a second fingerprint comparison component 340b, although the disclosure is not limited thereto.

The fingerprint comparison component 340 may receive the hash table 325 from the reference database 320 and the playback fingerprint data 335 from the second fingerprint generator component 330 and may perform content identification to determine content identification data 345 corresponding to the playback data 306. For example, the playback fingerprint data 335 may include a query fingerprint comprising a plurality of frames and the fingerprint comparison component 340 may generate content identification data 345 indicating identification data (e.g., content identification) for a media content item associated with the playback data 306. Thus, in some examples the content identification data 345 may identify a single media content item being output by the device 110, although the disclosure is not limited thereto.

In some examples, the fingerprint comparison component 340 may perform content identification based on a frequency of occurrence in the query fingerprint. Thus, the fingerprint comparison component 340 may identify identification data that is associated with a highest number of frames included in the query fingerprint. For example, the fingerprint comparison component 340 may perform a hash lookup for each frame of the plurality of frames and increment a count for individual media content items associated with the plurality of frames. To illustrate an example with reference to FIG. 5, in which a query fingerprint is identical to the second fingerprint 520, after performing hash lookups for the first five frames of the query fingerprint the fingerprint comparison component 340 would determine that the second media content is associated with a first number of frames (e.g., Content 2=5 frames) while the fourth media content and the fifth media content are only associated with a single frame (e.g., Content 4=Content 5=1 frame). By continuing this process for the entire plurality of frames associated with the query fingerprint, the fingerprint comparison component 340 may determine that the query fingerprint is associated with the second media content item (e.g., Content 2).

In some examples, the fingerprint comparison component 340 may generate content identification data 345 indicating a single media content item corresponding to the playback data 306. For example, the fingerprint comparison component 340 may determine the media content item having a highest frequency of occurrence within the plurality of frames included in the query fingerprint. However, the disclosure is not limited thereto, and in other examples a number of media content items included in the content identification data 345 may vary without departing from the disclosure. For example, the fingerprint comparison component 340 may generate the content identification data 345 to indicate an n-best list (e.g., top 3 media content items), a variable number of media content items having a frequency above a threshold value, and/or the like without departing from the disclosure.

While the example described above illustrates an example in which the system 100 selects the reference fingerprint having the most shared frames (e.g., highest frequency of occurrence) of the potential reference fingerprints, the disclosure is not limited thereto. In some examples, the system 100 may only select the reference fingerprint having the most shared frames if the reference fingerprint satisfies a condition, such as the number of shared frames exceeds a threshold value (e.g., minimum number of shared frames) and/or the like. Thus, in some examples the system 100 may determine that none of the reference fingerprints match the query fingerprint if the highest total count does not exceed the threshold value without departing from the disclosure.

While the examples described above refer to the content identification data 345 indicating a media content item corresponding to a single query fingerprint, the disclosure is not limited thereto. In some examples, the system 100 may generate content identification data using a series of query fingerprints without departing from the disclosure. For example, FIG. 3B illustrates an example of fingerprint matching 350 that includes identification verification 355 to increase an accuracy of the content identification data generated by the system 100.

As illustrated in FIG. 3B, identification verification 355 may be configured to receive the content identification data 345 output by the fingerprint comparison component 340 and generate content verification data 375. For example, the identification verification 355 may include a fine-grained matching component 360 and/or a long-term matching component 370, although the disclosure is not limited thereto.

The fine-grained matching component 360 may improve an accuracy of the content identification by reducing a number of false matches. For example, the fine-grained matching component 360 may perform a direct comparison between the query fingerprint and each potential match (e.g., media content item(s)) indicated by the content identification data 345. To illustrate an example, the fine-grained matching component 360 may perform a fingerprint matching operation by matching the query fingerprint to the entire content for each media content item indicated by the content identification data 345, although the disclosure is not limited thereto.

The long-term matching component 370 may improve an accuracy of the content identification by matching the query fingerprints over time. For example, the long-term matching component 370 may identify media content item(s) that match two or more consecutive query fingerprints, increasing a likelihood that the media content item(s) correspond to the playback content being output by the device 110. Examples of how the long-term matching component 370 may identify media content item(s) are described below with regard to FIGS. 8-9.

While FIG. 3B illustrates an example in which the system 100 performs direct matching prior to performing aggregation (e.g., the fine-grained matching component 360 precedes the long-term matching component 370), the disclosure is not limited thereto. In some examples, the system 100 may perform aggregation prior to performing direct matching without departing from the disclosure. For example, performing direct matching (e.g., fine-grain matching) may be processing intensive and may require greater processing consumption to be completed. Thus, performing aggregation prior to performing direct matching may reduce the processing consumption required to determine content identification data as it avoids performing direct matching unless multiple query fingerprints correspond to the same media content item.

Additionally or alternatively, while FIG. 3B illustrates an example in which the system 100 performs fingerprint matching 350 using a combination of direct matching and aggregation (e.g., using both the fine-grained matching component 360 and the long-term matching component 370), the disclosure is not limited thereto. Instead, the system 100 may perform fingerprint matching 350 using direct matching without performing aggregation (e.g., only including the fine-grained matching component 360) or may perform fingerprint matching 350 using aggregation without performing direct matching (e.g., only including the long-term matching component 370) without departing from the disclosure.

In some examples, an individual reference fingerprint may correspond to an entirety of the media content item. For example, a first media content item (e.g., first content) may have a first length (e.g., 30 seconds) and may correspond to a first reference fingerprint that has the first length and represents the first media content item. Thus, a plurality of query fingerprints representing portions of the first media content item may be associated with the first reference fingerprint without departing from the disclosure. However, the disclosure is not limited thereto, and in other examples the media content item may correspond to a plurality of reference fingerprints without departing from the disclosure. For example, a second media content item (e.g., second content) may have the first length and may correspond to a plurality of reference fingerprints having a second length (e.g., 4 seconds), with each reference fingerprint of the plurality of reference fingerprints representing a respective portion of the second media content item. Thus, a single query fingerprint representing a first portion of the second media content may be associated with a single reference fingerprint of the plurality of reference fingerprints that represents the first portion of the second media content item without departing from the disclosure.

In the first example described above, the system 100 may determine that the query fingerprint is associated with a single reference fingerprint that corresponds to the first media content item. Thus, each of the reference fingerprints identified in steps 142-146 may correspond to distinct media content items, with the highest count indicating a specific media content item that includes the most shared frames with the query fingerprint. However, in the first example, the system 100 is unable to determine which portion of the first media content item is represented by the query fingerprint.

In contrast, in the second example described above, the system 100 may determine that the query fingerprint is associated with one or more reference fingerprints that correspond to the second media content item. Thus, several of the reference fingerprints identified in steps 142-146 may correspond to the same media content item (e.g., second media content item), with the highest count indicating the specific reference fingerprint that includes the most shared frames with the query fingerprint. While the second example increases a number of reference fingerprints associated with a single query fingerprint, it enables the system 100 to determine the specific portion of the second media content item that is represented by the query fingerprint.

The granularity enabled by the second example described above may be useful as it enables the system 100 to distinguish between two versions of the same media content item. For example, the second media content item (e.g., second content) may have the first length and may correspond to a first plurality of reference fingerprints having the second length (e.g., 4 seconds), while a third media content item (e.g., third content) may be an extended version of the second media content item. Thus, the third media content item may have a third length (e.g., 60 seconds) and may correspond to the first plurality of reference fingerprints and a second plurality of reference fingerprints. In this example, the system 100 may determine that the query fingerprint corresponds to a specific reference fingerprint and, by matching a series of query fingerprints to respective reference fingerprints, the system 100 may distinguish between the second media content item and the third media content item. For example, while the system 100 may determine that a query fingerprint corresponds to the same number of reference fingerprints associated with the second media content item and the third media content item, the system 100 may determine that the series of query fingerprints only corresponds to the first plurality of reference fingerprints. As the first plurality of reference fingerprints represents the second media content item in its entirety but only a first portion of the third media content item, the system 100 may generate content identification data associating the series of query fingerprints with the second media content item.

While the second example described above illustrates one example in which the system 100 may distinguish between two versions of the same media content item using a series of query fingerprints (e.g., aggregation), the disclosure is not limited thereto. In other examples, the system 100 may distinguish between two versions of the same media content item by performing direct matching without departing from the disclosure. As described in the first example above, the first media content item (e.g., first content) may have the first length (e.g., 30 seconds) and may correspond to the first reference fingerprint having the first length and representing the first media content item in its entirety. Thus, a plurality of query fingerprints representing portions of the first media content item may be associated with the first reference fingerprint without departing from the disclosure.

To perform direct matching, the system 100 may shift the query fingerprint, which has a second length (e.g., 4 seconds), across the entire first length of the first media content item. For example, the system 100 may compare the query fingerprint with a first portion of the first reference fingerprint, compare the query fingerprint with a second portion of the first reference fingerprint (e.g., shifting by two frames, although the disclosure is not limited thereto), and so on, until the system 100 has compared the query fingerprint to every possible portion of the first reference fingerprint. Based on these comparisons, the system 100 may determine whether the query fingerprint corresponds to the first reference fingerprint or whether it is a false positive (e.g., despite having a number of shared frames, the query fingerprint does not correspond to the first media content item). However, if the system 100 determines that the query fingerprint corresponds to the first reference fingerprint, the system 100 may determine that the query fingerprint is associated with a specific portion of the first reference fingerprint and/or the first media content item based on the direct matching.

To illustrate an example, the system 100 may compare the query fingerprint with the first reference fingerprint by calculating a bit error rate (BER) as the query fingerprint is shifted across the first reference fingerprint. For example, the system 100 may determine a first bit error rate between the query fingerprint and the first portion of the first reference fingerprint, may determine a second bit error rate between the query fingerprint and the second portion of the first reference fingerprint, and so on. The bit error rates indicate a number of bits that are different between the query fingerprint and the corresponding portion of the first reference fingerprint (e.g., non-matching bits), which can be used to determine which portion of the first reference fingerprint matches the query fingerprint. To illustrate an example, the system 100 may determine that the query fingerprint matches a portion of the first reference fingerprint when the bit error rate drops below a threshold value (e.g., 10%), indicating that fewer than 10% of the bits are different (e.g., 90%+ of the bits are identical), although the disclosure is not limited thereto. Based on the results of the direct matching, the system 100 may determine which portion of the first media content item corresponds to the query fingerprint and determine the content identification data, which may distinguish between different versions of the same media content item.

Figure 6A:
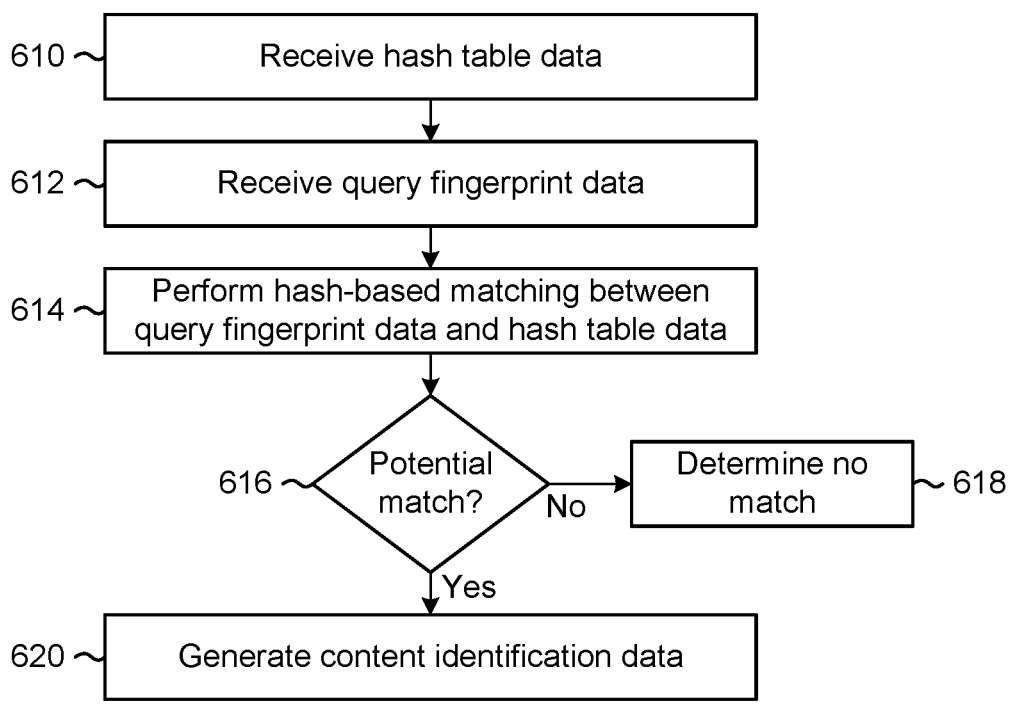
Figure 6C:
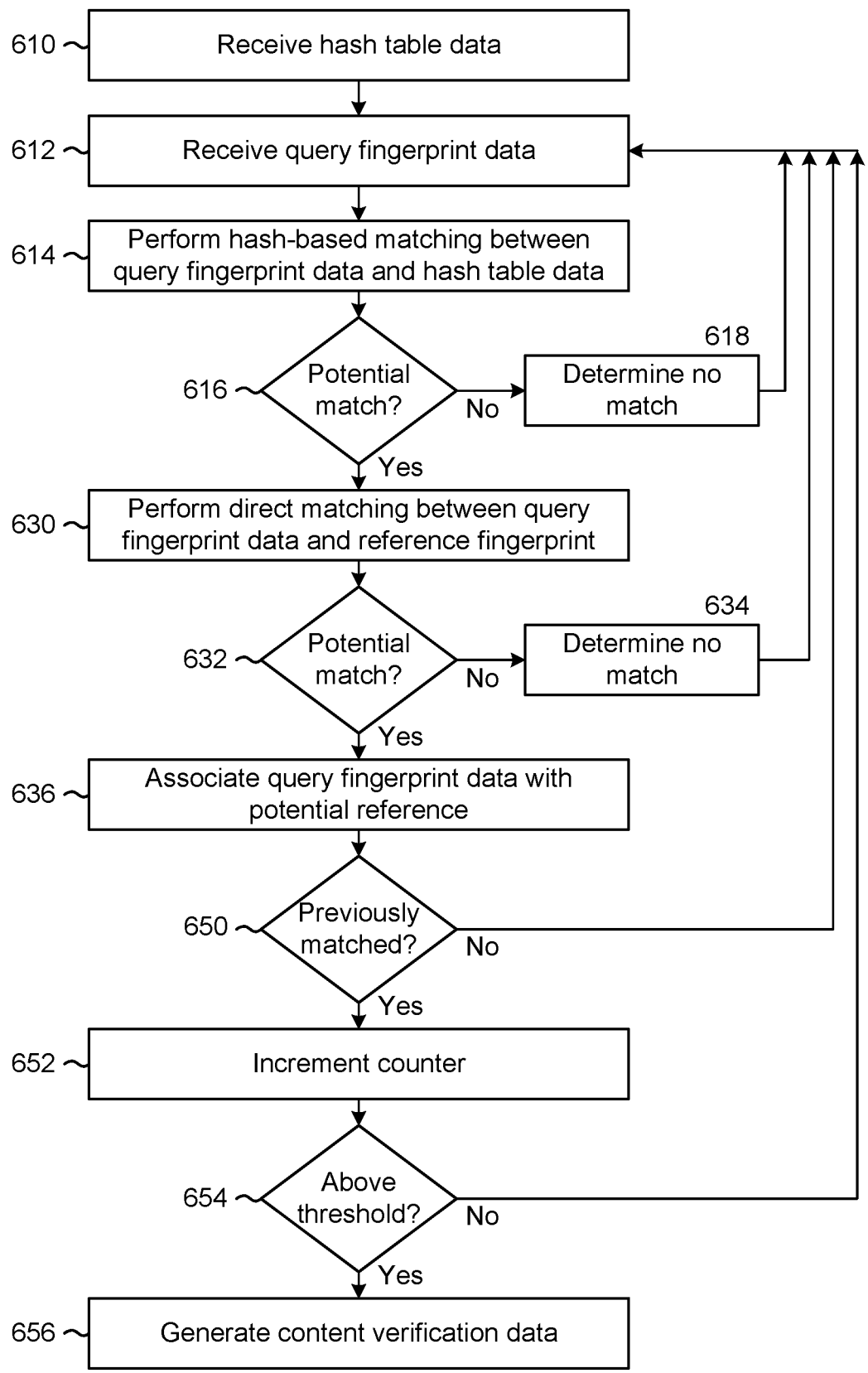

FIGS. 6A-6C are flowcharts conceptually illustrating examples of performing content identification using fingerprints according to embodiments of the present disclosure. As illustrated in FIG. 6A, the system 100 may receive (610) hash table data corresponding to the reference fingerprints stored in the reference database, as described in greater detail above with regard to FIGS. 3A-3B. In addition, the system 100 may receive (612) query fingerprint data and perform (614) hash-based matching between the query fingerprint data and the hash table data, as described in greater detail above. For example, for an individual frame of the query fingerprint data, the system 100 may determine a hash key (e.g., feature vector associated with the frame) and use the hash key to identify one or more reference fingerprints associated with the frame in the hash table data. By determining a total number of associations between reference fingerprints and the frames and/or hash keys associated with the query fingerprint data, the system 100 may determine one or more potential matches for the query fingerprint data.

Based on the hash-based matching, the system 100 may determine (616) whether there is a potential match for the query fingerprint data and, if not, may determine (618) that there is no match for the query fingerprint data. For example, the system 100 may determine that a highest number of associations between the query fingerprint data and a potential reference fingerprint does not satisfy a condition, indicating that a highest number of shared frames is below a minimum threshold value (e.g., minimum number of shared frames), although the disclosure is not limited thereto.

If the system 100 determines that there is a potential match for the query fingerprint data in step 616, the system 100 may generate (620) content identification data corresponding to the potential match. For example, the system 100 may determine that one or more potential reference fingerprints are associated with the query fingerprint data and satisfy the condition described above. In some examples, the system 100 may generate the content identification data indicating the potential reference fingerprint having the highest number of associations (e.g., highest number of shared frames between the query fingerprint data and the potential reference fingerprint). However, the disclosure is not limited thereto, and in other examples the system 100 may generate the content identification data indicating an n-best list of potential reference fingerprints, a variable number of potential reference fingerprints that satisfy a threshold value, and/or the like without departing from the disclosure.

In some examples, the system 100 may perform hash-based matching between the query fingerprint data and the hash table data to generate the content identification data, and then perform additional verification step(s) to generate content verification data, such as direct matching and/or aggregation. As described above with regard to FIG. 3B, the content verification data may be similar to the content identification data described above, but may be associated with a higher confidence value and/or likelihood that a media content item indicated by the content verification data corresponds to the query fingerprint data. For example, the content verification data may indicate a single potential reference fingerprint having the highest number of associations (e.g., highest number of shared frames between the query fingerprint data and the potential reference fingerprint (s)), an n-best list of potential reference fingerprints, a variable number of potential reference fingerprints that satisfy a threshold value, and/or the like without departing from the disclosure.

As illustrated in FIG. 6B, the system 100 may perform steps 610-618, as described above, but may perform additional step(s) to verify that the media content item associated with the potential reference fingerprint corresponds to the query fingerprint data (e.g., the system 100 may perform identification verification 355). Thus, in some examples, if the system 100 determines in step 616 that there is a potential match for the query fingerprint data, the system 100 may perform (630) direct matching between the query fingerprint data and the potential reference fingerprint(s) and may determine (632) whether the direct matching indicates that the potential reference fingerprint(s) are a match. For example, the system 100 may perform the direct matching process described above with regard to FIG. 3B for each potential reference fingerprint identified by the hash-based matching performed in step 614.

If the system 100 determines that the query fingerprint data does not match any of the potential reference fingerprints, the system 100 may determine (634) that there is no match for the query fingerprint data. In some examples, the system 100 may perform direct matching by shifting the query fingerprint data across the potential reference data and determining bit error rates for each comparison (e.g., each time the query fingerprint data is shifted). Thus, the system 100 may determine that there is no match for the query fingerprint data when a minimum bit error rate is above a threshold value, indicating that there are too many non-matching bits between the query fingerprint data and the potential reference fingerprint.

If the minimum bit error rate is below the threshold value, the system 100 may determine that there is a potential match in step 632 and may associate (636) the query fingerprint data with the potential reference fingerprint. In response to associating the query fingerprint data with the potential reference fingerprint, the system 100 may perform (638) aggregation to determine content verification data. For example, the system 100 may perform aggregation by determining that a potential reference fingerprint (or a media content item associated with multiple potential reference fingerprints) is associated with a series of query fingerprints in a row. Thus, the system 100 may generate content verification data indicating that the series of query fingerprints corresponds to the media content item associated with the reference fingerprint(s).

FIG. 6C illustrates an example of performing aggregation. As illustrated in FIG. 6C, the system 100 may perform steps 610-618 and 630-636, as described above, to associate the query fingerprint data with a potential reference fingerprint. If the system 100 determines that the query fingerprint data does not match with a potential reference fingerprint in steps 618 or 634, the system 100 may loop to step 612 and repeat steps 612-618 and 630-636 for subsequent query fingerprint data. Thus, the system 100 may continue to process query fingerprints as they are received.

If the system 100 associates the query fingerprint data with a potential reference fingerprint and/or a media content item associated with the potential reference fingerprint in step 636, however, the system 100 may determine (650) whether a previous query fingerprint matched with the potential reference fingerprint and/or the media content item. For example, the system 100 may determine that a series of query fingerprints are associated with the potential reference fingerprint, or that the series of query fingerprints are associated with a series of reference fingerprints corresponding to the media content item, and/or the like. If the system 100 determines that the previous query fingerprint did not match with the reference fingerprint and/or the media content item, the system 100 may loop to step 612 and repeat steps 612-618 and 630-636 for a subsequent query fingerprint, as described above.

If the system 100 determines that the previous query fingerprint matched with the reference fingerprint and/or the media content item, the system 100 may increment (652) a counter value associated with a counter for the media content item and determine (654) whether the counter value is above a threshold value. If the counter value is below the threshold value, the system 100 may loop to step 612 and repeat steps 612-618 and 630-636 for a subsequent query fingerprint, as described above. However, if the counter value is above the threshold value, the system 100 may generate (656) content verification data indicating the media content item associated with the reference fingerprint(s).

While FIGS. 6B-6C illustrate examples in which the system 100 performs direct matching prior to performing aggregation (e.g., the fine-grained matching component 360 precedes the long-term matching component 370), the disclosure is not limited thereto. In some examples, the system 100 may perform aggregation prior to performing direct matching without departing from the disclosure. For example, performing direct matching (e.g., fine-grain matching) may be processing intensive and may require greater processing consumption to be completed. Thus, performing aggregation prior to performing direct matching may reduce the processing consumption required to determine content identification data as it avoids performing direct matching unless multiple query fingerprints correspond to the same media content item.

Additionally or alternatively, while FIGS. 6B-6C illustrate examples in which the system 100 performs a combination of direct matching and aggregation (e.g., using both the fine-grained matching component 360 and the long-term matching component 370), the disclosure is not limited thereto. Instead, the system 100 may perform direct matching without performing aggregation (e.g., only including the fine-grained matching component 360) or may perform aggregation without performing direct matching (e.g., only including the long-term matching component 370) without departing from the disclosure.

Figure 7:
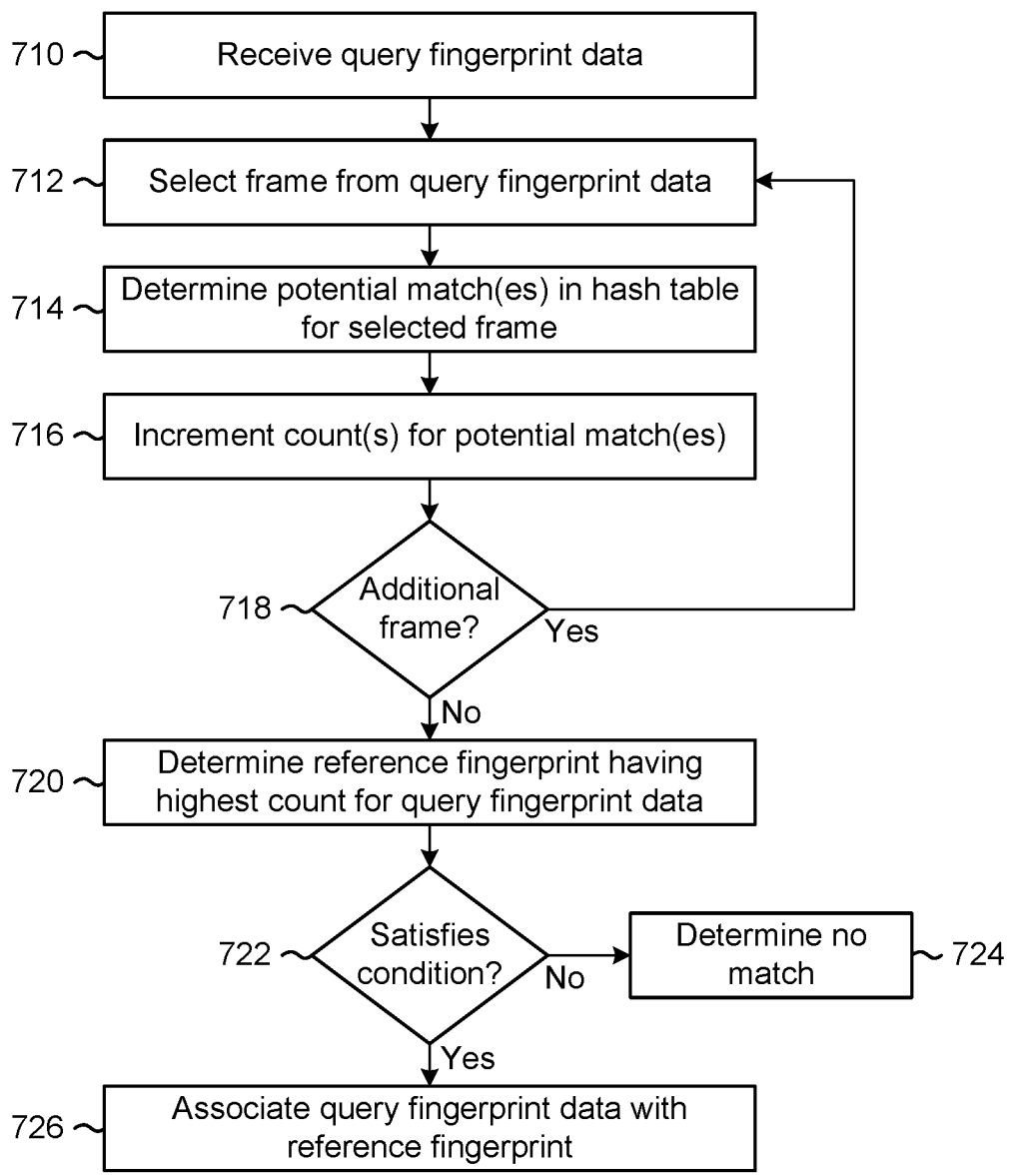
FIG. 7 is a flowchart conceptually illustrating an example of performing content identification using a hash table according to embodiments of the present disclosure.

FIG. 7 is a flowchart conceptually illustrating an example of performing content identification using a hash table according to embodiments of the present disclosure. As illustrated in FIG. 7, the system 100 may receive (710) query fingerprint data and may perform hash-based matching. Thus, the system 100 may select (712) a frame from the query fingerprint data, may determine (714) potential match (es) in the hash table for the selected frame, and may (716) increment count(s) for the potential match(es). For example, the system 100 may use the frame and/or feature data associated with the frame as a hash key and may determine, using the hash table, one or more potential reference fingerprints associated with the hash key. If the hash table associates the hash key with a potential reference fingerprint, the system 100 may increment a counter value corresponding to the potential reference fingerprint. Thus, the counter value indicates a total number of associations, which may represent a number of shared frames that are included in the query fingerprint data and the potential reference fingerprint.

The system 100 may determine (718) whether there is an additional frame, and if so, may loop to step 712 and repeat steps 712-716 for the additional frame. If the system 100 determines that there isn't an additional frame, the system 100 may determine (720) a potential reference fingerprint having a highest count for the query fingerprint data. For example, the system 100 may determine the potential reference fingerprint having the highest number of associations or shared frames with the query fingerprint data. The system 100 may determine (722) whether the potential reference fingerprint satisfies a condition, and if not, may determine (724) that there are no matches for the query fingerprint data. For example, if the highest count indicates that a highest number of shared frames is below a threshold value, the system 100 may determine that the query fingerprint data is not associated with any of the potential reference fingerprints. However, if the highest count indicates that the highest number of shared frames satisfies the condition (e.g., is above the threshold value), the system 100 may associate (726) the query fingerprint data with the reference fingerprint, although the disclosure is not limited thereto.

While FIG. 7 illustrates an example in which the system 100 selects a single potential reference fingerprint in step 720, the disclosure is not limited thereto. For example, the system 100 may select two or more potential reference fingerprints in step 720 having the highest counts and may then determine whether any of the two or more potential reference fingerprints satisfy the condition without departing from the disclosure. In some examples, the system 100 may select between the two or more potential reference fingerprints in step 722 and associate a single potential reference fingerprint with the query fingerprint data in step 726. However, the disclosure is not limited thereto and in other examples the system 100 may select two or more potential reference fingerprints in step 720 and may determine that two or more of the potential reference fingerprints satisfy the condition, thus associating the query fingerprint data with multiple reference fingerprints without departing from the disclosure. Thus, the system 100 may select a single potential reference fingerprint having the highest number of associations (e.g., highest number of shared frames between the query fingerprint data and the potential reference fingerprint(s)), an n-best list of potential reference fingerprints, a variable number of potential reference fingerprints that satisfy a threshold value, and/or the like without departing from the disclosure.

Figure 8:
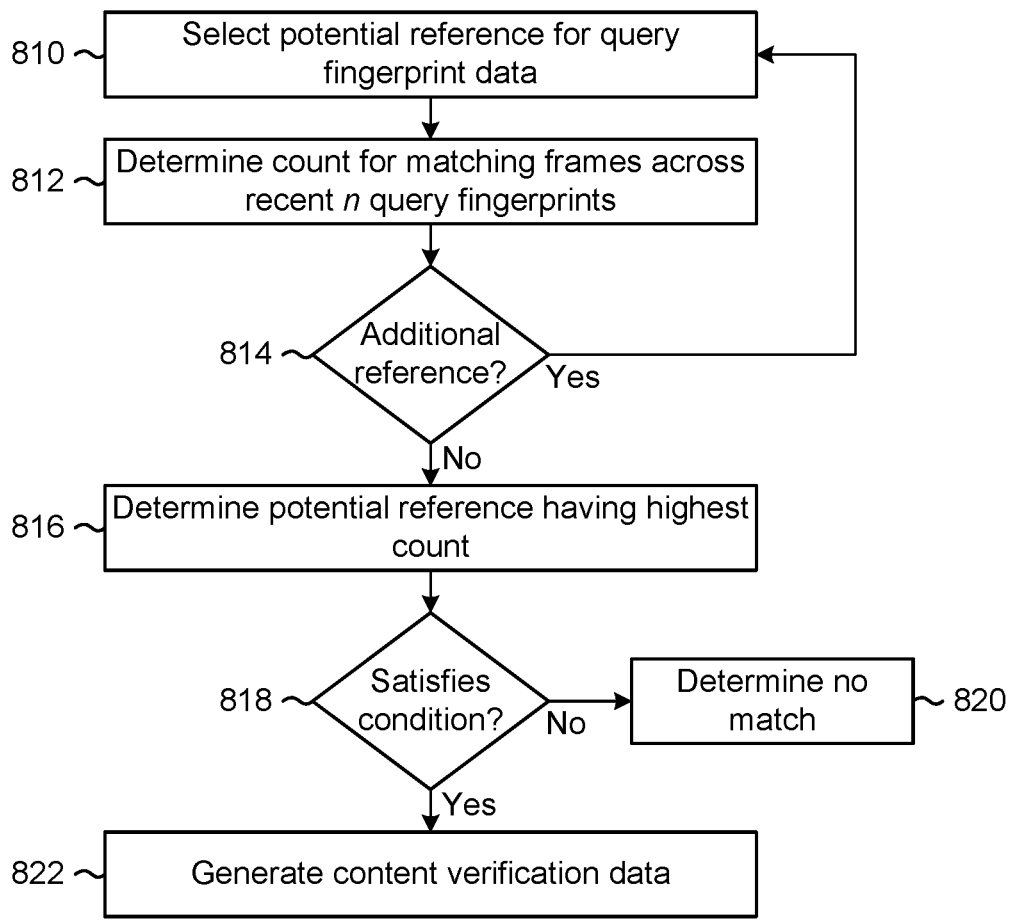
FIG. 8 is a flowchart conceptually illustrating an example of performing content identification using fingerprints over time according to embodiments of the present disclosure.

FIG. 8 is a flowchart conceptually illustrating an example of performing content identification using fingerprints over time according to embodiments of the present disclosure. As illustrated in FIG. 8, the system 100 may select (810) a potential reference fingerprint for the query fingerprint data and may determine (812) a count of all matching frames (e.g., shared frames) across recent n query fingerprints. For example, the system 100 may determine a total number of associations between the most recent n query fingerprints (e.g., 5 most recent query fingerprints) and the potential reference fingerprint, although the disclosure is not limited thereto. The system 100 may then determine (814) whether there is an additional potential reference fingerprint and, if so, may loop to step 810 and repeat steps 810-812 for the additional potential reference fingerprint.

Once the system 100 has determined the total counts for matching frames for each of the potential reference fingerprints, the system 100 may determine (816) a potential reference fingerprint having a highest count and may determine (818) whether the potential reference fingerprint satisfies a condition. If the highest count does not satisfy the condition, the system 100 may determine (820) that there are no matches for the query fingerprint data. For example, if the highest count indicates that a highest number of shared frames is below a threshold value, the system 100 may determine that the query fingerprint data is not associated with any of the potential reference fingerprints. However, if the highest count indicates that the highest number of shared frames satisfies the condition (e.g., is above the threshold value), the system 100 may generate (822) content verification data indicating that a media content item corresponding to the reference fingerprint is associated with the query fingerprint data and/or a series of query fingerprints.

While FIG. 8 illustrates an example in which the system 100 selects a single potential reference fingerprint in step 816, the disclosure is not limited thereto. For example, the system 100 may select two or more potential reference fingerprints in step 816 having the highest counts and may then determine whether any of the two or more potential reference fingerprints satisfy the condition without departing from the disclosure. In some examples, the system 100 may select between the two or more potential reference fingerprints in step 818 and generate the content verification data using a single potential reference fingerprint in step 822. However, the disclosure is not limited thereto and in other examples the system 100 may select two or more potential reference fingerprints in step 818 and may determine that two or more of the potential reference fingerprints satisfy the condition, thus generating the content verification data using multiple reference fingerprints without departing from the disclosure. Thus, the system 100 may select a single potential reference fingerprint having the highest number of associations (e.g., highest number of shared frames between the query fingerprints and the potential reference fingerprint (s)), an n-best list of potential reference fingerprints, a variable number of potential reference fingerprints that satisfy a threshold value, and/or the like without departing from the disclosure.

Figure 9:
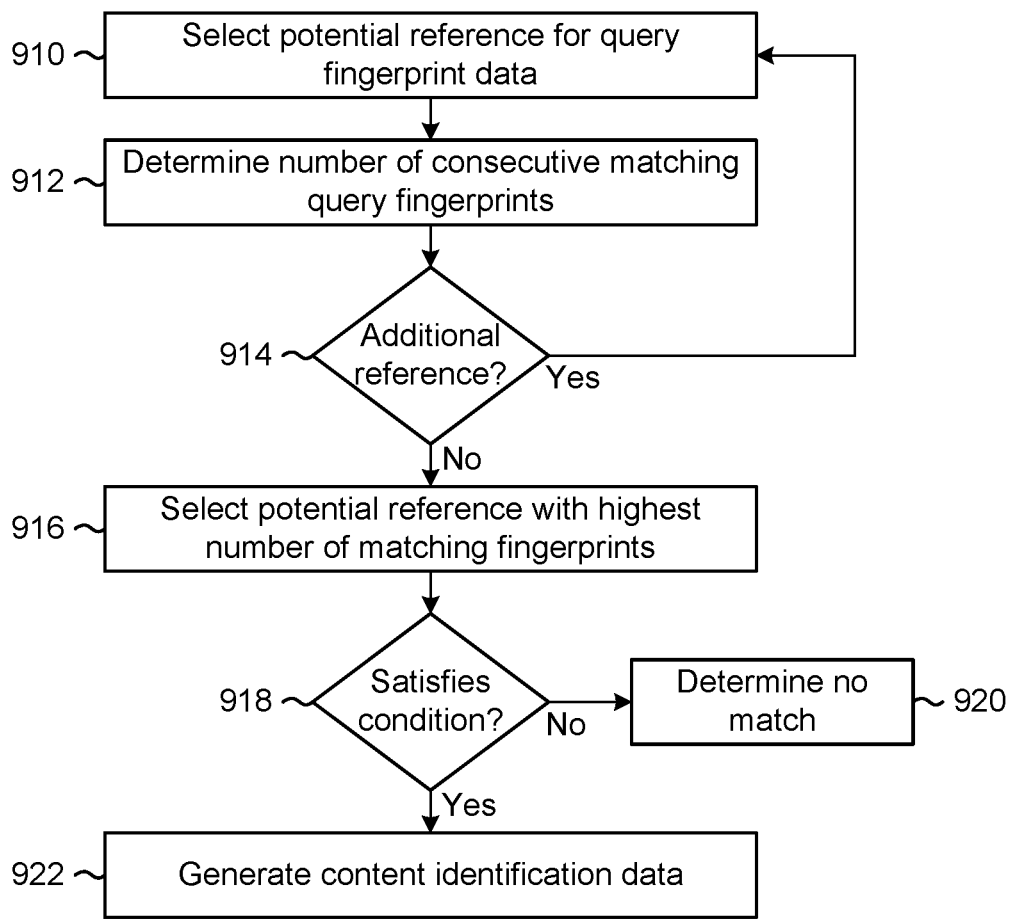
FIG. 9 is a flowchart conceptually illustrating an example of performing content identification using fingerprints over time according to embodiments of the present disclosure.

FIG. 9 is a flowchart conceptually illustrating an example of performing content identification using fingerprints over time according to embodiments of the present disclosure. As illustrated in FIG. 9, the system 100 may select (910) a potential reference fingerprint for the query fingerprint data and may determine (912) a number of consecutive matching query fingerprints. In some examples, the system 100 may determine a first number of consecutive query fingerprints that match the selected reference fingerprint, while in other examples the system 100 may determine a second number of consecutive query fingerprints that match one of multiple reference fingerprints corresponding to a single media content item without departing from the disclosure. After determining the number of consecutive matching query fingerprints, the system 100 may determine (914) whether there is another potential reference fingerprint and, if so, may loop to step 910 and repeat steps 910-912 for the additional potential reference fingerprint.

After determining the number of consecutive matching query fingerprints for each of the potential reference fingerprints, the system 100 may select (916) a potential reference fingerprint with the highest number of matching fingerprints and determine (918) whether the potential reference fingerprint satisfies a condition. For example, the system 100 may determine whether the highest number of matching fingerprints exceeds a threshold value, although the disclosure is not limited thereto. If the system 100 determines that the potential reference fingerprint does not satisfy the condition, the system 100 may determine (920) that the query fingerprint data does not have a match and is not associated with any of the reference fingerprints. However, if the system 100 determines that the potential reference fingerprint satisfies the condition, the system 100 may generate (922) content identification data indicating a media content item associated with the reference fingerprint, although the disclosure is not limited thereto.

While FIG. 9 illustrates an example in which the system 100 selects a single potential reference fingerprint in step 916, the disclosure is not limited thereto and the system 100 may select multiple potential reference fingerprints without departing from the disclosure, as described above with regard to FIGS. 7-8. Additionally or alternatively, while FIG. 9 illustrates that the system 100 may generate content identification data, the disclosure is not limited thereto and the system 100 may generate content verification data without departing from the disclosure. For example, including the number of consecutive matching query fingerprints may correspond to performing aggregation, thus increasing a confidence score and/or likelihood that the media content item is associated with the query fingerprint data.

Figure 10:
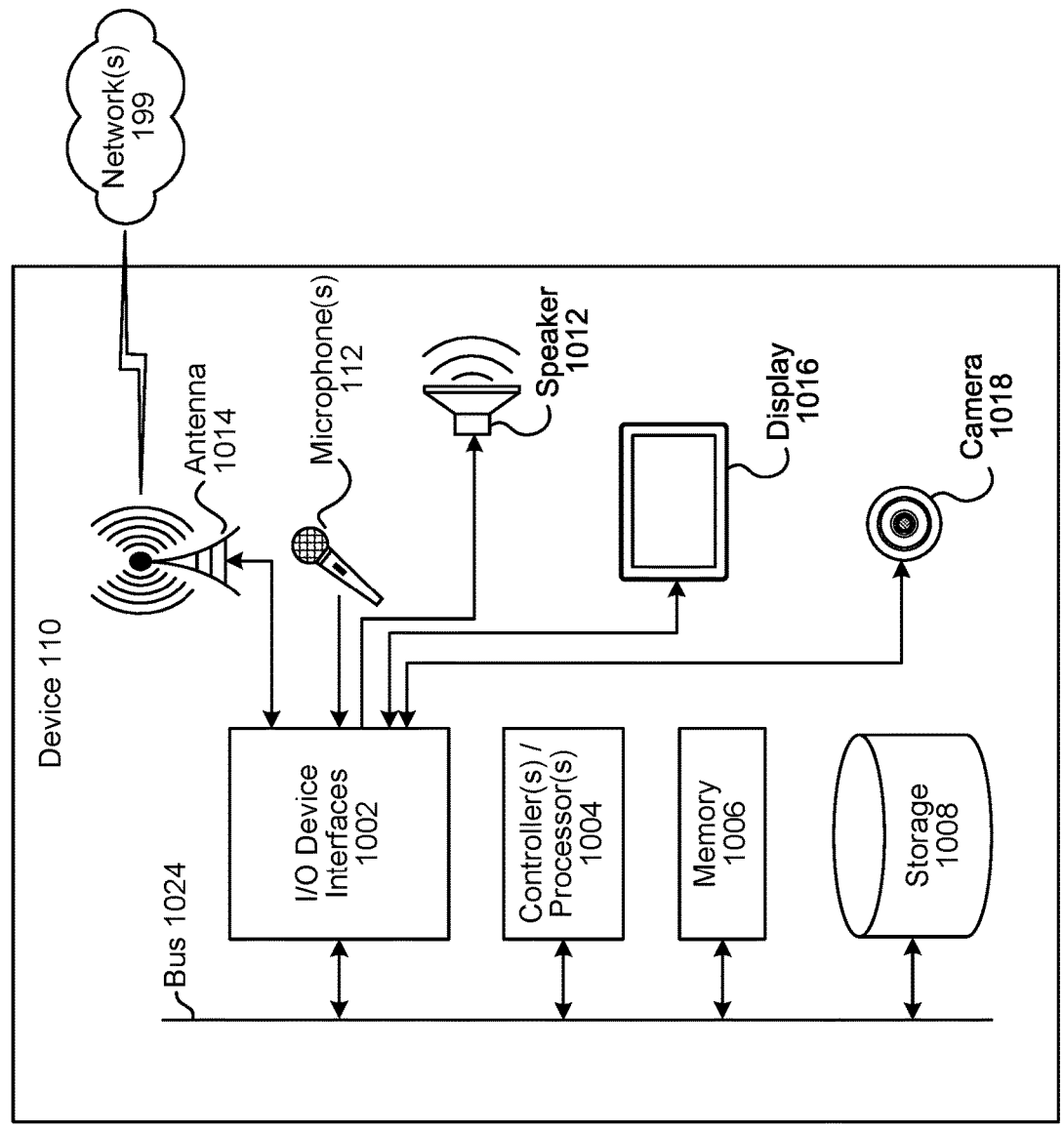
FIG. 10 is a block diagram conceptually illustrating example components of a device, according to embodiments of the present disclosure.
Figure 11:
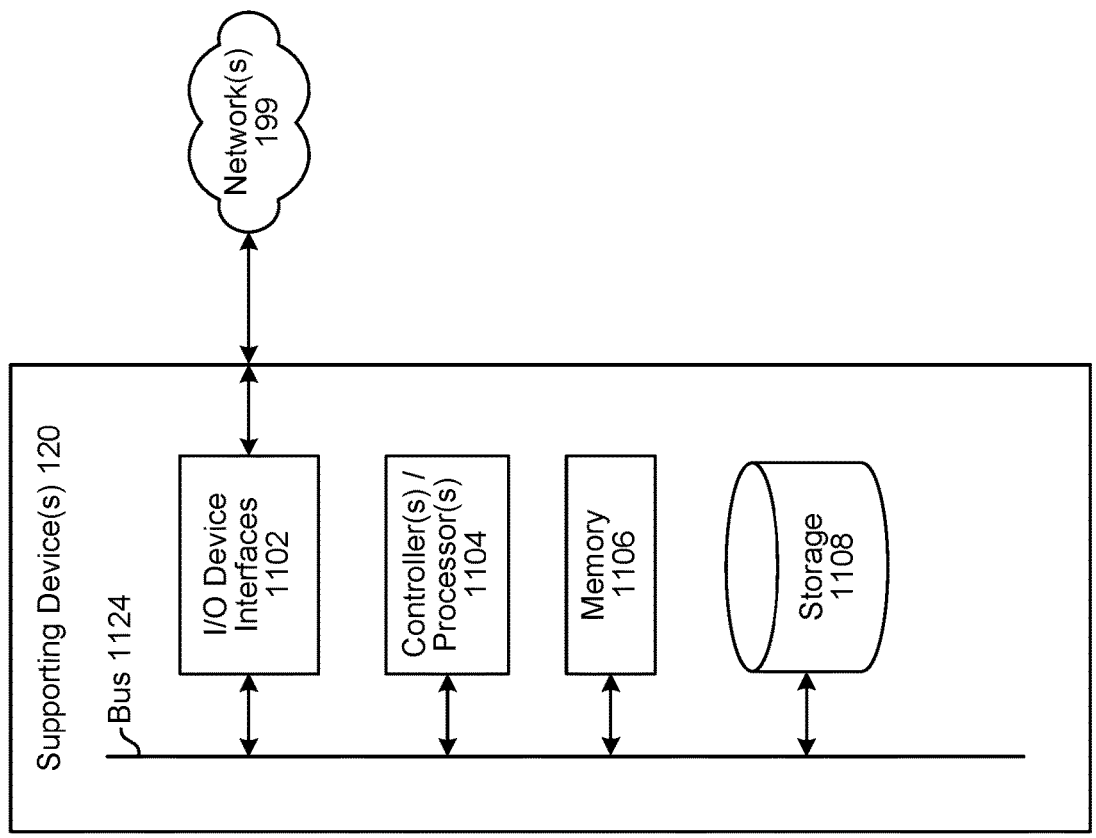
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of supporting device(s) 120, such as the natural language command processing system, which may assist with ASR processing, NLU processing, etc. A supporting device(s) (120) may include one or more servers. A "server"

as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/supporting device(s) 120 may be located remotely from the device 110 as its operations may not require proximity to the user. The server/supporting device(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/supporting device(s) 120 being in a user's home/business is that data used to process a command/return a response may be kept within the user's home, thus reducing potential privacy concerns.

Multiple supporting device(s) (120) may be included in the overall system 100 of the present disclosure, such as one or more natural language processing systems for performing ASR processing, one or more natural language processing systems for performing NLU processing, etc. In operation, each of these systems may include computer-readable and computer-executable instructions that reside on the respective supporting device(s) (120), as will be discussed further below.

Each of these devices (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as one or more loudspeaker(s) 1012, a wired headset or a wireless headset (not illustrated), or other component capable of outputting audio. The device 110 may also include an audio capture component. The audio capture component may be, for example, one or more microphone(s) 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110 and/or the supporting device(s) 120 may include their own dedicated processors, memory, and/or storage. Alternatively, one or more of the components of the device(s) 110 and/or the supporting device(s) 120 may utilize the I/O interfaces (1002/1102), processor(s) (1004/1104), memory (1006/1106), and/or storage (1008/1108) of the device(s) 110 and/or the supporting device(s) 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, and the supporting device(s) 120, as described herein, are illustrative, and may be located as a stand-alone device or may be included, in whole or in part, as a component of a larger device or system. As can be appreciated, a number of components may exist either on the supporting device(s) 120 and/or on the device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
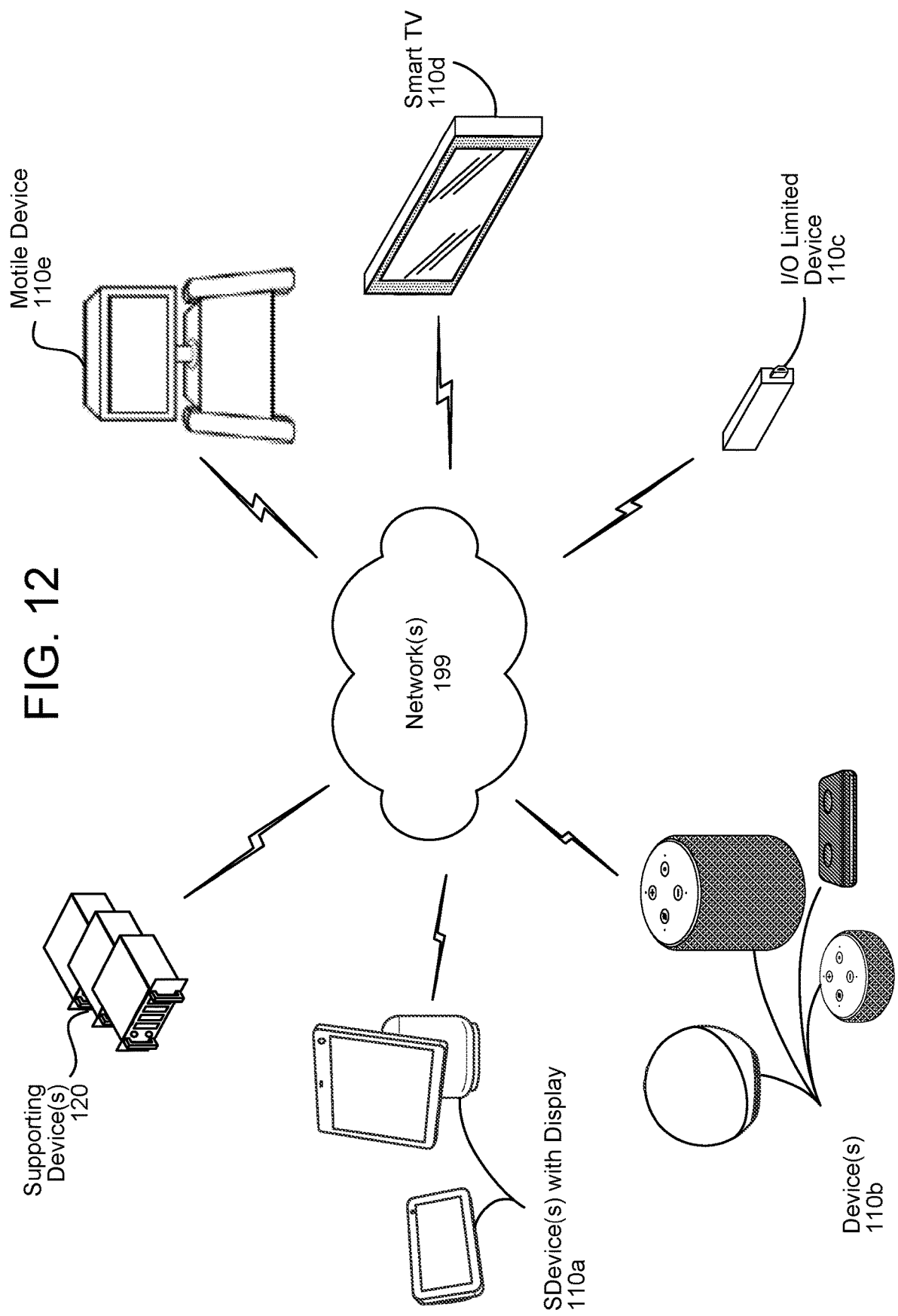
FIG. 12 illustrates an example of a computer network for use with the overall system, according to embodiments of the present disclosure.

As illustrated in FIG. 12, multiple devices (110a-110e, 120) may contain components of the system and the devices may be connected over a network(s) 199. The network(s) 199 may include a local or private network or may include a wide network such as the Internet. Devices may be connected to the network(s) 199 through either wired or wireless connections. For example, device(s) with display 110a, device(s) 110b, an input/output limited device 110c, a display/smart television 110d, and/or a motile device 110e may be connected to the network(s) 199 through a wireless service provider, over a Wi-Fi or cellular network connection, or the like. Other devices are included as network-connected support devices, such as the natural language command processing system, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving first data corresponding to an audio fingerprint representation of audio data, the first data including first feature data corresponding to a first frame of the audio data and second feature data corresponding to a second frame of the audio data;

determining, using a hash function and the first feature data as a first hash key, a first hash value of a first plurality of hash values, the first hash value corresponding to the first feature data, the hash function mapping a second plurality of hash keys to the first plurality of hash values, wherein the first frame of the audio data only corresponds to the first hash value of the first plurality of hash values;

determining, using the hash function and the second feature data as a second hash key, a second hash value of the first plurality of hash values, the second hash value corresponding to the second feature data, wherein the second frame of the audio data only corresponds to the second hash value of the first plurality of hash values;

using a hash table to determine that the first hash value is associated with first identification data corresponding to a first media content item, the hash table including (i) first association data associating the first identification data and first values of the first plurality of hash values and (ii) second association data associating second identification data and second values of the first plurality of hash values, the second identification data corresponding to a second media content item;

determining, using the hash table, that the second hash value is associated with the first identification data and with the second identification data;

determining a first number of frames of the audio data that are associated with the first identification data;
determining a second number of frames of the audio data that are associated with the second identification data;
determining that the first number of frames is greater than the second number of frames; and
in response to determining that the first number of frames is greater than the second number of frames, determining that the audio data represents the first media content item.

2. The computer-implemented method of claim 1, further comprising:
determining second data corresponding to a second audio fingerprint representing the first media content item;
determining a bit error rate between the first data and the second data, the bit error rate indicating a number of bits that are different between the first data and the second data;
determining that the bit error rate is below a threshold value indicating that the first data matches the second data; and
in response to determining that the bit error rate is below the threshold value, determining that the audio data represents the first media content item.

3. The computer-implemented method of claim 1, further comprising:
determining that second data is associated with the first identification data;
determining a duration of time corresponding to the first data and the second data;
determining that the duration of time exceeds a time threshold value; and
in response to determining that the duration of time exceeds the time threshold value, generating content identification data including the first identification data.

4. The computer-implemented method of claim 1, further comprising:
determining a number of consecutive audio fingerprints associated with the first identification data;
determining that the number of consecutive audio fingerprints satisfies a condition; and
in response to determining that the number of consecutive audio fingerprints satisfies the condition, generating content identification data indicating that the first media content item is associated with the audio data.

5. A computer-implemented method, the method comprising:
determining first data including first feature data representing a first segment of input data including a first frame of the input data and second feature data representing a second segment of the input data including a second frame of the input data;
determining, using a hash function and the first feature data as a first hash key, a first hash value corresponding to the first segment of the input data;
determining, using the hash function and the second feature data as a second hash key, a second hash value corresponding to the second segment of the input data;
determining, using a hash table, that the first hash value is associated with first identification data;
determining, using the hash table, that the second hash value is associated with the first identification data and second identification data;
determining a first number of hash keys of the first data that are associated with the first identification data;
determining a second number of hash keys of the first data that are associated with the second identification data;
determining that the first number of hash keys is greater than the second number of hash keys; and
storing an association between the first data and the first identification data.

6. The computer-implemented method of claim 5, further comprising:
determining second data corresponding to the first identification data;
determining an error rate between the first data and the second data;
determining that the error rate satisfies a condition; and
determining that the input data represents a media content item associated with the first identification data.

7. The computer-implemented method of claim 5, further comprising:
determining that second data is associated with the first identification data;
determining a duration of time corresponding to the first data and the second data;
determining that the duration of time exceeds a time threshold value; and
determining that the input data represents a media content item associated with the first identification data.

8. The computer-implemented method of claim 5, further comprising:
determining a number of consecutive fingerprints associated with the first identification data;
determining that the number of consecutive fingerprints satisfies a condition; and
in response to determining that the number of consecutive fingerprints satisfies the condition, generating content identification data indicating that the input data represents a media content item associated with the first identification data.

9. The computer-implemented method of claim 5, further comprising:
receiving the input data, the first frame of the input data corresponding to a first audio frame and the second frame of the input data corresponding to a second audio frame;
determining, using the first frame of the input data, first energy values including a first value associated with a first frequency range and a second value associated with a second frequency range; and
determining, using the first energy values, the first feature data.

10. The computer-implemented method of claim 5, further comprising:
receiving the input data, the first frame of the input data corresponding to a first image frame and the second frame of the input data corresponding to a second image frame;
determining, using the first frame of the input data, first pixel values including first values associated with first pixel coordinates of the first image frame and second values associated with second pixel coordinates of the first image frame; and
determining, using the first pixel values, the first feature data.

11. The computer-implemented method of claim 5, further comprising:
receiving second data including third feature data representing a third segment of the input data and fourth feature data representing a fourth segment of the input data;

determining, using the hash table, a third number of hash keys of the second data that are associated with the first identification data;
determining, using the hash table, a fourth number of hash keys of the second data that are associated with the second identification data;
determining that the third number of hash keys is greater than the fourth number of hash keys;
determining that the third number of hash keys is below a threshold value; and
in response to determining that the third number of hash keys is below the threshold value, determining that the second data does not correspond to the first identification data.

12. The computer-implemented method of claim 5, further comprising:
generating content identification data indicating that the input data represents a media content item associated with the first identification data;
receiving first audio data representing a voice command; and
determining, using the content identification data, an action to perform that is responsive to the voice command.

13. A system comprising:
at least one processor; and
memory including instructions operable to be executed by the at least one processor to cause the system to:
determine first data including first feature data representing a first segment of input data including a first frame of the input data and second feature data representing a second segment of the input data including a second frame of the input data;
determine, using a hash function and the first feature data as a first hash key, a first hash value corresponding to the first segment of the input data;
determine, using the hash function and the second feature data as a second hash key, a second hash value corresponding to the second segment of the input data;
determine, using a hash table, that the first hash value is associated with first identification data;
determine, using the hash table, that the second hash value is associated with the first identification data and second identification data;
determine a first number of hash keys of the first data that are associated with the first identification data;
determine a second number of hash keys of the first data that are associated with the second identification data;
determine that the first number of hash keys is greater than the second number of hash keys; and
store an association between the first data and the first identification data.

14. The system of claim 13, wherein the memory further comprises instructions that, when executed by the at least one processor, further cause the system to:
determine second data corresponding to the first identification data;
determine an error rate between the first data and the second data;
determine that the error rate satisfies a condition; and
determine that the input data represents a media content item associated with the first identification data.

15. The system of claim 13, wherein the memory further comprises instructions that, when executed by the at least one processor, further cause the system to:
determine that second data is associated with the first identification data;
determine a duration of time corresponding to the first data and the second data;
determine that the duration of time exceeds a time threshold value; and
determine that the input data represents a media content item associated with the first identification data.

16. The system of claim 13, wherein the memory further comprises instructions that, when executed by the at least one processor, further cause the system to:
determine a number of consecutive fingerprints associated with the first identification data;
determine that the number of consecutive fingerprints satisfies a condition; and
in response to determining that the number of consecutive fingerprints satisfies the condition, generate content identification data indicating that the input data represents a media content item associated with the first identification data.

17. The system of claim 13, wherein the memory further comprises instructions that, when executed by the at least one processor, further cause the system to:
receive the input data, the first frame of the input data corresponding to a first audio frame and the second frame of the input data corresponding to a second audio frame;
determine, using the first frame of the input data, first energy values including a first value associated with a first frequency range and a second value associated with a second frequency range; and
determine, using the first energy values, the first feature data.

18. The system of claim 13, wherein the memory further comprises instructions that, when executed by the at least one processor, further cause the system to:
receive the input data, the first frame of the input data corresponding to a first image frame and the second frame of the input data corresponding to a second image frame;
determine, using the first frame of the input data, first pixel values including first values associated with first pixel coordinates of the first image frame and second values associated with second pixel coordinates of the first image frame; and
determine, using the first pixel values, the first feature data.

19. The system of claim 13, wherein the memory further comprises instructions that, when executed by the at least one processor, further cause the system to:
receive second data including third feature data representing a third segment of the input data and fourth feature data representing a fourth segment of the input data;
determine, using the hash table, a third number of hash keys of the second data that are associated with the first identification data;
determine, using the hash table, a fourth number of hash keys of the second data that are associated with the second identification data;
determine that the third number of hash keys is greater than the fourth number of hash keys;
determine that the third number of hash keys is below a threshold value; and
in response to determining that the third number of hash keys is below the threshold value, determining that the second data does not correspond to the first identification data.

20. The system of claim 13, wherein the memory further comprises instructions that, when executed by the at least one processor, further cause the system to:

generate content identification data indicating that the input data represents a media content item associated with the first identification data;

receive first audio data representing a voice command; and determine, using the content identification data, an action to perform that is responsive to the voice command.

21. The computer-implemented method of claim 5, wherein each frame of the input data corresponds to a single hash value included in the hash table.

\* \* \* \* \*